United States Patent
Ujibashi et al.

(10) Patent No.: US 9,483,319 B2
(45) Date of Patent: Nov. 1, 2016

(54) JOB SCHEDULING APPARATUS AND METHOD THEREFOR

(71) Applicant: FUJITSU LIMITED, Kawasaki-shi, Kanagawa (JP)

(72) Inventors: Yoshifumi Ujibashi, Kawasaki (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/592,955

(22) Filed: Jan. 9, 2015

(65) Prior Publication Data

US 2015/0220370 A1 Aug. 6, 2015

(30) Foreign Application Priority Data

Feb. 4, 2014 (JP) ................................ 2014-019227

(51) Int. Cl.
*G06F 9/46* (2006.01)
*G06F 9/50* (2006.01)

(52) U.S. Cl.
CPC ................................ *G06F 9/5088* (2013.01)

(58) Field of Classification Search
CPC .................................................. G06F 9/5088
USPC .................................................. 718/101–108
See application file for complete search history.

(56) References Cited

U.S. PATENT DOCUMENTS

| | | | | |
|---|---|---|---|---|
| 5,671,361 A * | 9/1997 | Brown | ............... | G06Q 10/06 705/7.23 |
| 6,621,505 B1 * | 9/2003 | Beauchamp | ........... | G06Q 10/10 715/700 |
| 6,691,109 B2 * | 2/2004 | Bjornson | .......... | G06F 17/30445 |
| 7,051,328 B2 * | 5/2006 | Rai | ........................ | G06Q 10/10 718/100 |
| 7,721,290 B2 * | 5/2010 | Horikawa | ............. | G06F 9/4862 709/201 |
| 2002/0007297 A1 * | 1/2002 | Clarke | ................... | G06Q 10/06 705/7.14 |
| 2005/0015504 A1 * | 1/2005 | Dorne | ................... | G06Q 10/06 709/229 |
| 2009/0012963 A1 * | 1/2009 | Johnson | ............... | G06F 9/5044 |
| 2009/0113434 A1 * | 4/2009 | Podila | .................. | G06F 9/4881 718/102 |

(Continued)

FOREIGN PATENT DOCUMENTS

JP 7-200496 8/1995

OTHER PUBLICATIONS

Chase, Jeffrey S., et al. "Dynamic virtual clusters in a grid site manager." High Performance Distributed Computing, 2003. Proceedings. 12th IEEE International Symposium on. IEEE, 2003, pp. 1-11.*
Zhao, Wei, Krithivasan Ramamritham, and John Stankovic. "Scheduling tasks with resource requirements in hard real-time systems." Software Engineering, IEEE Transactions on 5 (1987): pp. 564-577.*
Tchernykh, Andrei, et al. "Two level job-scheduling strategies for a computational grid." Parallel Processing and Applied Mathematics. Springer Berlin Heidelberg, 2006. pp. 774-781.*
Tang, Xueyan, and Samuel T. Chanson. "Optimizing static job scheduling in a network of heterogeneous computers." Parallel Processing, 2000. Proceedings. 2000 International Conference on. IEEE, 2000. pp. 373-382.*
Sabuncuoglu, Ihsan, and M. Bayiz. "Analysis of reactive scheduling problems in a job shop environment." European Journal of operational research 126.3 (2000): pp. 567-586.*
Hamscher, Volker, et al. "Evaluation of job-scheduling strategies for grid computing." International Workshop on Grid Computing. Springer Berlin Heidelberg, 2000. pp. 191-202.*

*Primary Examiner* — Satish Rampuria
(74) *Attorney, Agent, or Firm* — Fujitsu Patent Center

(57) ABSTRACT

A plurality of compute nodes are divided into a plurality of groups. A maximum available resource amount determining unit determines, for each of the plurality of groups, the available resource amount of the compute node having the greatest available resource amount among the compute nodes belonging to the group as the maximum available resource amount of the group. An excluding unit compares the resource consumption of a job with the maximum available resource amount of each of the plurality of groups, and excludes a group whose maximum available resource amount is less than the resource consumption from search objects. A searching unit searches for a compute node whose available resource amount is greater than or equal to the resource consumption, from the compute nodes belonging to a group that is not excluded from the search objects.

9 Claims, 22 Drawing Sheets

(56) References Cited

U.S. PATENT DOCUMENTS

| | | | |
|---|---|---|---|
| 2009/0288087 A1* | 11/2009 | Ringseth | G06F 9/4881 718/102 |
| 2010/0083263 A1* | 4/2010 | Machida | G06F 11/3409 718/102 |
| 2011/0061057 A1* | 3/2011 | Harris | G06F 9/5072 718/104 |
| 2012/0030684 A1* | 2/2012 | Meng | G06F 9/5072 718/104 |
| 2012/0179824 A1* | 7/2012 | Jackson | G06F 9/5027 709/226 |
| 2013/0047164 A1* | 2/2013 | Ujibashi | G06F 9/4881 718/104 |
| 2013/0117752 A1* | 5/2013 | Li | G06F 9/5066 718/102 |

\* cited by examiner

111 RESOURCE INFORMATION

| NODE NO. | GROUP NO. | NUMBER OF CORES | NUMBER OF AVAILABLE CORES | MEMORY AMOUNT | AVAILABLE MEMORY AMOUNT |
|---|---|---|---|---|---|
| 0 | 1 | 8 | 3 | 4GB | 50% |
| 1 | 1 | 8 | 6 | 4GB | 70% |
| ⋮ | ⋮ | ⋮ | ⋮ | ⋮ | ⋮ |
| 1000 | 2 | 8 | 2 | 4GB | 8% |
| 1001 | 2 | 8 | 1 | 4GB | 5% |
| ⋮ | ⋮ | ⋮ | ⋮ | ⋮ | ⋮ |

FIG. 5

121 MAXIMUM AVAILABILITY VALUE PAIR INFORMATION

| GROUP NO. | MAXIMUM NUMBER OF AVAILABLE CORES | MAXIMUM AVAILABLE MEMORY AMOUNT |
|---|---|---|
| 0 | 6 | 70% |
| 1 | 2 | 10% |
| ⋮ | ⋮ | ⋮ |

FIG. 6

122 MAXIMUM AVAILABILITY VALUE PAIR TABLE

MAXIMUM AVAILABLE MEMORY AMOUNT (%)

| | 10 | 20 | 30 | 40 | 50 | 60 | 70 | 80 | 90 | 100 |
|---|---|---|---|---|---|---|---|---|---|---|
| 1 | 5 | 2 | 0 | 0 | 3 | 3 | 2 | 3 | 0 | 0 |
| 2 | 4 | 1 | 2 | 7 | 7 | 8 | 0 | 0 | 0 | 3 |
| 3 | 4 | 2 | 5 | 6 | 9 | 5 | 6 | 7 | 2 | 4 |
| 4 | 5 | 0 | 0 | 7 | 9 | 9 | 9 | 8 | 7 | 5 |
| 5 | 2 | 0 | 4 | 6 | 8 | 9 | 9 | 8 | 4 | 3 |
| 6 | 3 | 0 | 3 | 5 | 4 | 9 | 9 | 8 | 4 | 0 |
| 7 | 4 | 0 | 5 | 7 | 3 | 2 | 2 | 3 | 2 | 2 |
| 8 | 5 | 1 | 0 | 1 | 1 | 1 | 2 | 2 | 1 | 1 |

MAXIMUM NUMBER OF AVAILABLE CORES (row labels 1–8)

FIG. 8

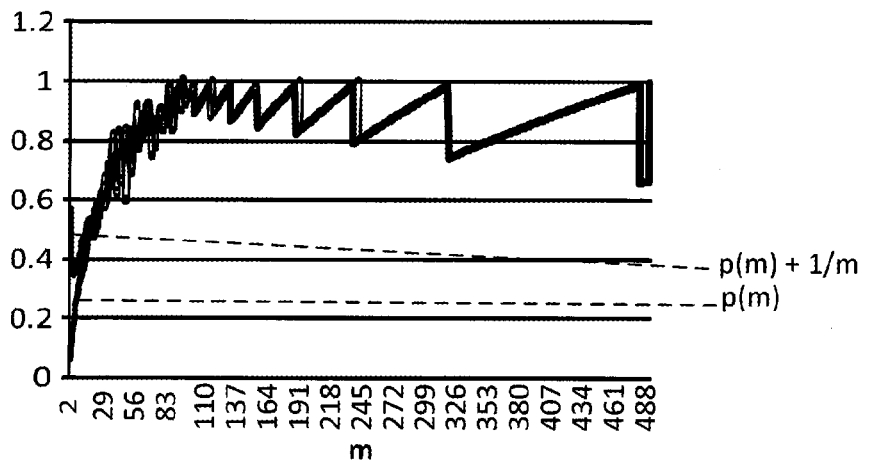
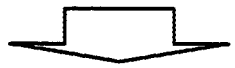
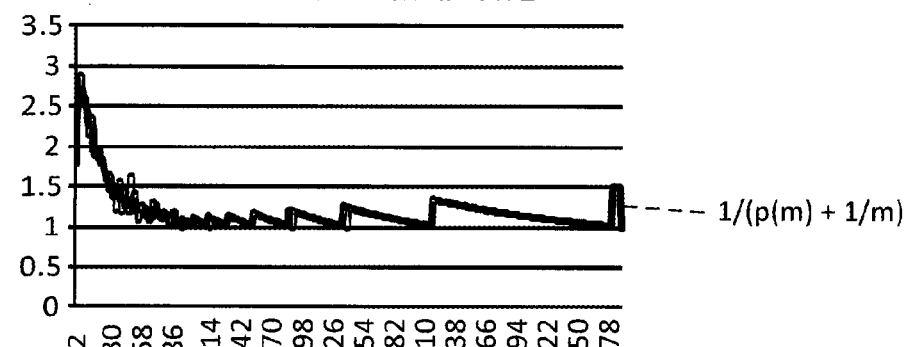
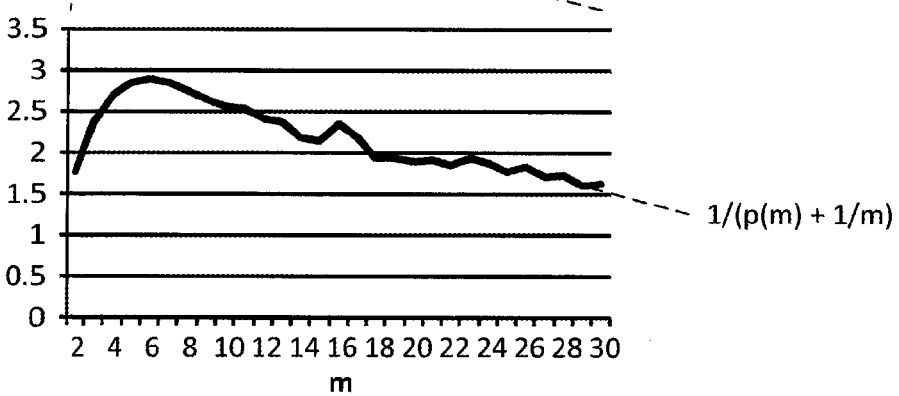
FIG. 20

JOB SCHEDULING APPARATUS AND METHOD THEREFOR

CROSS-REFERENCE TO RELATED APPLICATION

This application is based upon and claims the benefit of priority of the prior Japanese Patent Application No. 2014-019227, filed on Feb. 4, 2014, the entire contents of which are incorporated herein by reference.

FIELD

The embodiments discussed herein are related to a job scheduling apparatus and a method therefore.

BACKGROUND

In high performance computing (HPC) used in computing centers and the like, jobs are assigned to computational resources of compute nodes such that the computational resources are used fairly and efficiently. Each job is executed on a compute node allocated to the job. Upon completion of execution of the job, the resources allocated to the job are released.

Apparatuses that provide computational resources for HPC include personal computer (PC) clusters, symmetric multiple processor (SMP) machines, supercomputers with dedicated hardware, and various other apparatuses. Computational resources may also be referred to simply as "resources". There are various types of resources. For example, processors and memories are one type of resources. Processors that serve as resources are not limited to central processing units (CPUs), but include various other computational resources such as general-purpose computing on graphics processing units (GPGPUs), many-core processors, and the like. In the case of multi-core processors, each processor core (hereinafter referred to simply as a "core") may be handled as an individual resource.

The processing content of jobs that are executed varies widely, including structural analysis, fluid analysis, and the like. Further, the types of jobs include a sequential job that is executed on a single core, and a parallel job that is executed on a plurality of cores. A parallel job may be processed by a plurality of cores of a single compute node or may be processed by a plurality of compute nodes in parallel. Accordingly, the compute node to be allocated to the job needs to have the number of available cores corresponding to the number of cores to be used for executing the job. Further, the amount of memory used by the job varies depending on its processing content. Accordingly, the compute node to be allocated to the job needs to have the amount of available memory corresponding to the amount of memory used by the job.

Assigning jobs to resources is called job scheduling. The amount of available resources that the assignment destination needs to have differs from job to job. Accordingly, in job scheduling, a determination of whether it is possible to assign a job is made for each of compute nodes. Note that assigning jobs to resources of compute nodes is often also called as allocating resources to jobs. One technique related to allocating resources to jobs is to provide a job class definition table storing in advance information indicating the number of processors (the maximum value) that may be used at the same time by a job of each job class, a processor group corresponding to the job class, and so on. With this technique, the number of processors and the processor group corresponding to a job requested to be executed are calculated by referring to the job class definition table. Then, processors are allocated.

See, for example, Japanese Laid-open Patent Publication No. 07-200496.

However, the currently available job scheduling techniques are not able to effectively cope with an increasing system size. Therefore, as the system size increases, the processing time for job scheduling increases. That is, as the system size increases and hence the number of compute nodes increases, a determination of whether it is possible to assign a job to a compute node is made more frequently. As a result, the processing time for job scheduling becomes longer.

A longer processing time for job scheduling results in a lower processing efficiency of the entire system. For example, as the processing time for job scheduling becomes longer, a delay in instructing a compute node to execute a job increases accordingly. Further, it is not allowed to perform processing such as operating jobs, receiving commands, and the like, while updating the schedule. Therefore, various operations such as operating jobs and the like are delayed.

SUMMARY

According to one aspect of the invention, there is provided a job scheduling apparatus that includes a processor configured to perform a procedure including: determining, for each of a plurality of groups into which a plurality of compute nodes are divided, an available resource amount of a compute node having a greatest available resource amount among compute nodes belonging to the group as a maximum available resource amount of the group; comparing resource consumption of a job with the maximum available resource amount of each of the plurality of groups, and excluding a group whose maximum available resource amount is less than the resource consumption from search objects; and searching for a compute node whose available resource amount is greater than or equal to the resource consumption, from compute nodes belonging to a group that is not excluded from the search objects.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of resource information;

FIG. 6 illustrates an example of maximum availability value pair information;

FIG. 8 illustrates an example of a maximum availability value pair table;

FIG. 20 illustrates the simulation results of a first job;

DESCRIPTION OF EMBODIMENTS

Figure 1:
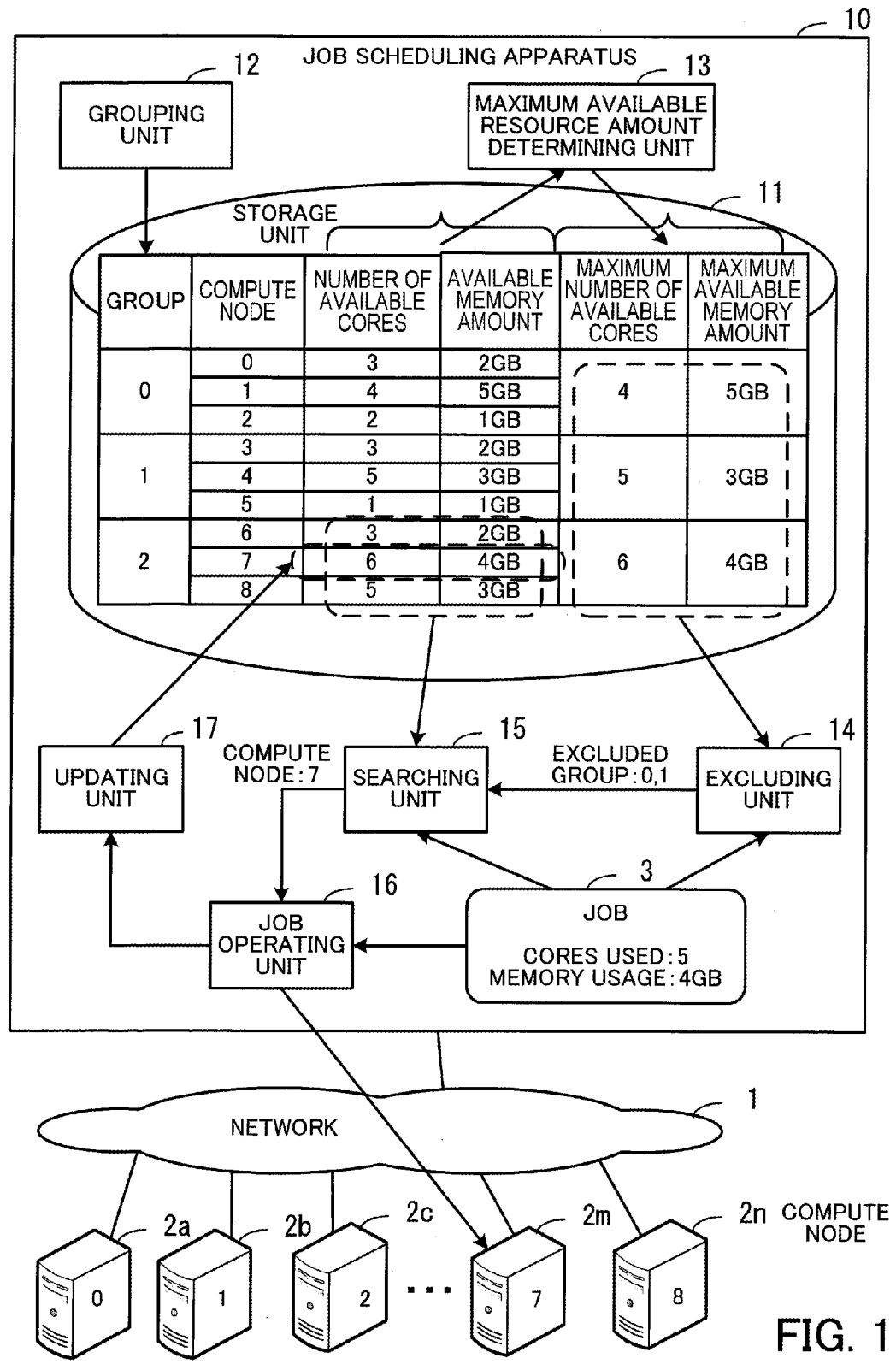
FIG. 1 is a block diagram illustrating exemplary functions of a job scheduling apparatus according to a first embodiment.

Several embodiments will be described below with reference to the accompanying drawings, wherein like reference numerals refer to like elements throughout. Note that features of certain embodiments may be combined with features of other embodiments as long as no inconsistency arises.

(a) First Embodiment

FIG. 1 is a block diagram illustrating exemplary functions of a job scheduling apparatus 10 according to a first embodiment. The job scheduling apparatus 10 is connected to a plurality of compute nodes 2a, 2b, 2c, . . . , 2m, and 2n via a network 1. The job scheduling apparatus 10 performs scheduling for executing jobs on the plurality of compute nodes 2a, 2b, 2c, 2m, and 2n.

The job scheduling apparatus 10 includes, for job scheduling, a storage unit 11, a grouping unit 12, a maximum available resource amount determining unit 13, an excluding unit 14, a searching unit 15, a job operating unit 16, and an updating unit 17.

The storage unit 11 stores the available resource amount of each of the plurality of compute nodes. For example, the storage unit 11 stores the number of available cores and the available memory amount of each compute node. Further, the storage unit 11 may also store, for example, the identifier of a group to which each compute node belongs, the maximum number of available cores of the group, and the maximum available memory amount of the group.

The grouping unit 12 calculates the number of compute nodes per group that maximizes the processing efficiency, based on the frequency distribution of the maximum available resource amount of each of the plurality of groups. Then, the grouping unit 12 performs grouping again by dividing the plurality of compute nodes into groups each including the calculated number of compute nodes. After performing grouping, the grouping unit 12 stores the identifier of the group to which each compute node belongs, in association with the compute node, in the storage unit 11, for example.

The number of compute nodes per group that is set for grouping may be determined in view of improvement in the processing efficiency to be achieved by grouping. For example, the grouping unit 12 generates a plurality of candidate values for the number of compute nodes per group, and calculates, for each of the generated candidate values, the degree of improvement in the processing efficiency when the candidate value is set as the number of compute nodes per group. Then, the grouping unit 12 selects the candidate value that maximizes the processing efficiency as the number of compute nodes per group. Thus, it is possible to enhance the efficiency of the job scheduling process.

Further, the grouping unit 12 may calculate the degree of improvement in the processing efficiency, for each of the candidate values in ascending order, and may terminate the calculation of the degree of improvement in the processing efficiency when the degree of improvement in the processing efficiency tends to decrease as the candidate value increases. In this case, the grouping unit 12 selects the candidate value that maximizes the processing efficiency as the number of compute node per group, from among the candidate values for which the degree of improvement in the processing efficiency is already calculated. Thus, it is possible to reduce the number of times that the degree of improvement in the processing efficiency is calculated.

The maximum available resource amount determining unit 13 determines, for each of the plurality of groups, the available resource amount of the compute node having the greatest available resource amount among the compute nodes belonging to the group as the maximum available resource amount of the group. Note that in the case where the available resource amount of each compute node is managed on a per-resource-type basis, the maximum available resource amount determining unit 13 determines the maximum available resource amount on a per-resource-type basis. The maximum available resource amount determining unit 13 stores the maximum available resource amount of the group in, for example, the storage unit 11.

The excluding unit 14 compares the resource consumption of a job 3 with the maximum available resource amount of each of the plurality of groups, and excludes a group whose maximum available resource amount is less than the resource consumption from search objects. Note that in the case where the available resource amount of each compute node is managed on a per-resource-type basis, the excluding unit 14 compares the resource consumption of the job 3 with the maximum available resource amount of each of the plurality of groups on the per-resource-type basis. In this case, the excluding unit excludes a group whose maximum available resource amount of at least one resource type is less than the resource consumption from the search objects.

The searching unit 15 searches for a compute node 2m whose available resource amount is greater than or equal to the resource consumption of the job 3, from the compute nodes belonging to a group that is not excluded from the search objects.

The job operating unit 16 instructs the compute node 2m whose available resource amount is greater than or equal to the resource consumption of the job 3 to execute the job 3. Further, the job operating unit 16 detects that execution of the job 3 is completed by the compute node 2m having been instructed to execute the job 3. For example, the job operating unit 16 recognizes completion of execution of the job 3 in response to reception of a report of completion of job execution from the compute node 2m.

The updating unit 17 updates the available resource amount of the compute node 2 stored in the storage unit 11, upon issuance of an instruction for executing the job 3 to the compute node 2 or upon completion of execution of the job 3 by the compute node 2. For example, when an instruction for executing the job 3 is issued to the compute node 2, the updating unit 17 subtracts the resource consumption of the job 3 from the available resource amount of the compute node 2m stored in the storage unit 11. Further, when the compute node 2m completes execution of the job 3, the updating unit 17 adds the resource consumption of the job 3 to the available resource amount of the compute node 2m stored in the storage unit 11.

In the job scheduling apparatus 10 described above, the grouping unit 12 performs grouping by dividing a plurality of compute nodes into groups. Then, the maximum available resource amount determining unit 13 determines the maximum available resource amount of each group. In the example of FIG. 1, the available amounts of two types of resources (the number of cores and the memory amount) are managed for each compute node in the storage unit 11. Thus, the maximum available resource amount determining unit 13 determines, as the maximum number of available cores of the group, the number of available cores of the compute node having the greatest number of available cores among the group. Further, the maximum available resource amount determining unit 13 determines, as the maximum available memory amount of the group, the available memory amount of the compute node having the greatest available memory amount among the group.

Subsequently, for example, having received a request for execution of the job 3, the excluding unit 14 compares the resource consumption of the job 3 with the maximum available resource amount of each of the plurality of groups, and excludes a group whose maximum available resource amount is less than the resource consumption from search objects. Note that in the case where the available resource amount is managed for each of a plurality of types of resources, a group whose maximum available resource amount of at least one resource type is less than the resource consumption is excluded from search objects. For example, in the example of FIG. 1, the number of cores used (the number of cores consumed) by the job 3 is 5, and the memory usage (the memory consumption) of the job 3 is 4 GB. As for the group with the group number "0", the maximum number of available cores is 4, which is less than the number of cores used by the job 3. Therefore, the group with the group number "0" is excluded from search objects. As for the group with the group number "1", the maximum available memory amount is 3 GB, which is less than the memory usage of the job 3. Therefore, the group with the group number "1" is excluded from search objects. As for the group with the group number "2", the maximum number of available cores is 6, and the maximum available memory amount is 4 GB. That is, as for the group with the group number "2", the maximum number of available cores is greater than or equal to the number of cores used by the job 3, and the maximum available memory amount is greater than or equal to the memory usage of the job 3. Therefore, the group with the group number "2" is selected as a search object.

The group numbers of the groups excluded from search objects are reported to the searching unit 15. Then, the searching unit 15 searches for a compute node 2m whose available resource amount is greater than or equal to the resource consumption of the job 3, from the compute nodes belonging to the group that is not excluded from the search objects. In the example of FIG. 1, there are three compute nodes (compute nodes with the node numbers "6" through "8") belonging to the group with the group number "2" that is not excluded from the search objects. Thus, the searching unit 15 determines, for each of the three compute nodes, whether the available resource amount is greater than or equal to the resource consumption of the job 3. In the example of FIG. 1, as for the compute node with the compute node number "6", the number of available cores is 3, and the available memory amount is 2 GB. That is, the compute node with the compute node number "6" only has an amount of available resources that is less than the number of cores and the memory usage of the job 3. As for the compute node with the compute node number "7", the number of available cores is 6, and the available memory amount is 4 GB. That is, the compute node with the compute node number "7" has an amount of available resources that is greater than or equal to the resource consumption of the job 3. As for the compute node with the compute node number "8", the number of available cores is 5, and the available memory amount is 3 GB. That is, the compute node with the compute node number "8" only has a number of available cores that is less than the number of cores used by the job 3. As a result, the compute node 2m with the compute node number "7" is detected.

Upon detection of the compute node 2m, the job operating unit 16 transmits an instruction for executing the job 3 to the compute node 2m. Then, the updating unit 17 updates the values of the number of available cores and the available memory amount of the compute node 2m. Upon completion of execution of the job 3 by the compute node 2m, the job operating unit 16 detects completion of execution. Then, the updating unit 17 updates the values of the number of available cores and the available memory amount of the compute node 2m.

In this way, grouping is performed by dividing compute nodes into a plurality of groups, and a group whose maximum available resource amount is less than the resource consumption of the job 3 to be executed is excluded from search objects where a compute node to which a job may be assigned is searched for. Thus, the processing efficiency of job scheduling is improved. For example, in the example of FIG. 1, if a compute node capable of executing the job 3 is searched for from all the compute nodes without performing a process of excluding groups from search objects, comparison between the available resource amount and the resource consumption of a job is repeated a maximum of nine times. On the other hand, if a process of excluding groups from search objects is performed, comparison between the maximum available resource amount of a group and the resource consumption of a job is performed three times, and comparison between the available resource amount of a compute node of the search objet group (group number "2") and the resource consumption of the job is performed three times. That is, the comparison with the resource amount is needed to be performed only six times. This improves the processing efficiency.

Further, in recent years, as the system size has been increased, the number of compute nodes has been increased. For example, systems including thousands of nodes or tens of thousands of nodes have been put to practical use. However, as the number of compute nodes increases, the processing amount for scheduling increases. Therefore, with conventional techniques, the processing speed of the system is not sufficiently improved despite the increase in the number of compute nodes. As illustrated in the first embodiment, by excluding groups whose maximum available resource amount is less than the resource consumption of the job to be executed from search objects, it is possible to prevent an increase in the processing amount for job scheduling due to an increase in the number of nodes. As a result, it is possible to improve the processing speed in accordance with the increase in the system size.

Note that the excluding unit 14 may calculate the percentage of groups whose maximum available resource amount is greater than or equal to the resource consumption of a job, based on the frequency distribution of the maximum available resource amount of each of the plurality of groups, and determine whether the calculated percentage is greater than or equal to a predetermined value. If the calculated percentage is determined to be greater than or equal to the predetermined value, the excluding unit 14 does not perform the comparison between the resource consumption of the job 3 and the maximum available resource amount of each of the plurality of groups, for example. Thus, if the calculated percentage is greater than or equal to the predetermined value, the searching unit 15 searches for a compute node whose available resource amount is greater than or equal to the resource consumption from all the plurality of compute nodes. In this way, it is possible to employ one of the search methods, that is, the search method that determines for each group whether to exclude compute nodes of the group from search objects and excludes the compute nodes of the group determined to be excluded from search objects and the search method that selects all the compute nodes as search objects, which has a higher processing efficiency in accordance with the load conditions. As a result, it is possible to perform efficient job scheduling using an appropriate search method in accordance with the load conditions of the entire system.

Note that the grouping unit 12, the maximum available resource amount determining unit 13, the excluding unit 14, the searching unit 15, the job operating unit 16, and the updating unit 17 of FIG. 1 may be realized by, for example, the processor of the job scheduling apparatus 10. The storage unit 11 may be realized by, for example, the memory of the job scheduling apparatus 10.

The lines connecting the components of FIG. 1 represent some of communication paths. Communication paths other than those of FIG. 1 may be provided.

(b) Second Embodiment

The following describes a second embodiment.

Figure 2:
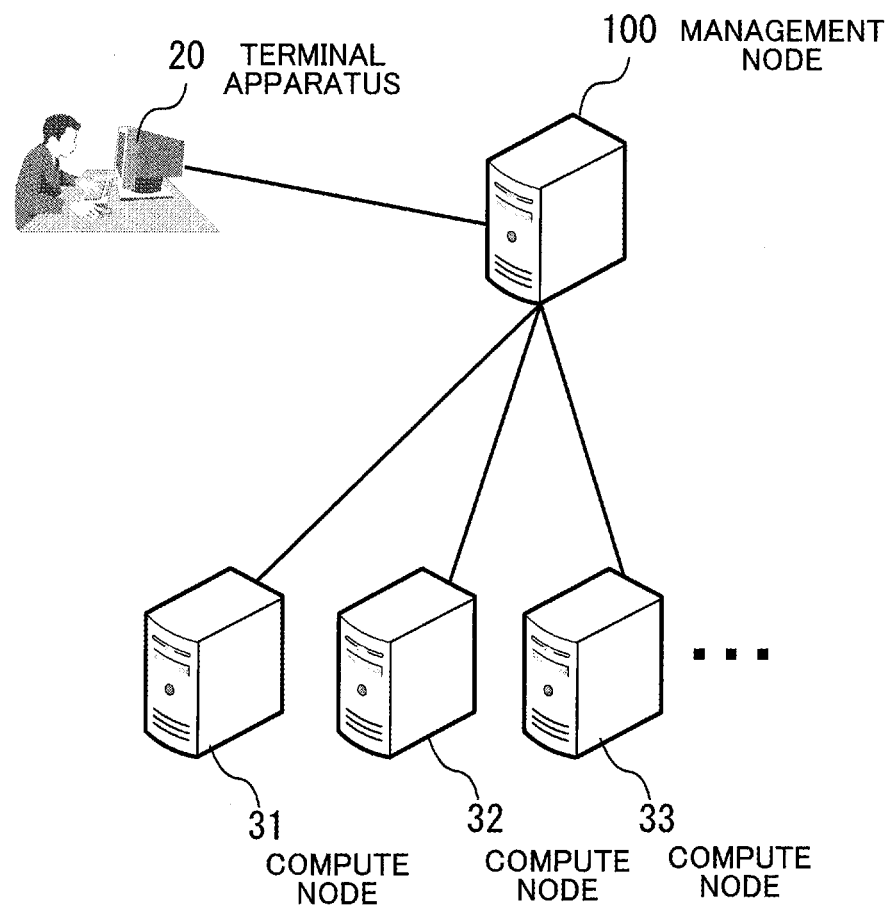
FIG. 2 illustrates an exemplary configuration of a system according to a second embodiment.

FIG. 2 illustrates an exemplary configuration of a system according to the second embodiment. A plurality of compute nodes 31, 32, 33, and so on are connected to a management node 100. The management node 100 is a computer that manages the compute nodes 31, 32, 33, and so on. The compute nodes 31, 32, 33, and so on are computers that execute jobs. In the case of a parallel job, a plurality of compute nodes selected from the compute nodes 31, 32, 33, and so on perform the job in cooperation with each other.

A terminal apparatus 20 is connected to the management node 100. The terminal apparatus 20 is a computer used by the user who specifies the content of the job to be executed. When specifying the content of the job to be executed, the user inputs the content of the job to be executed to the terminal apparatus 20, for example. The content of the job includes, for example, programs and data used for executing the job, the job type indicating whether the job is a sequential job or a parallel job, the parallelism of the job (the number of cores used) if the job is a parallel job, the amount of memory used, the maximum time needed to execute the job (the maximum execution time), and the like. The number of cores used for executing the job is, in other words, the core consumption of the job. Further, the amount of memory used for executing the job is, in other words, the memory consumption of the job. Then, the content of the job to be executed is transmitted from the terminal apparatus 20 to the management node 100 in accordance with an instruction from the user.

The management node 100 receives an execution request of the job from the terminal apparatus 20. Then, the management node 100 transmits the execution request of the job to the compute nodes 31, 32, 33, and so on, and receives the processing results of the job from the compute nodes 31, 32, 33, and so on.

Figure 3:
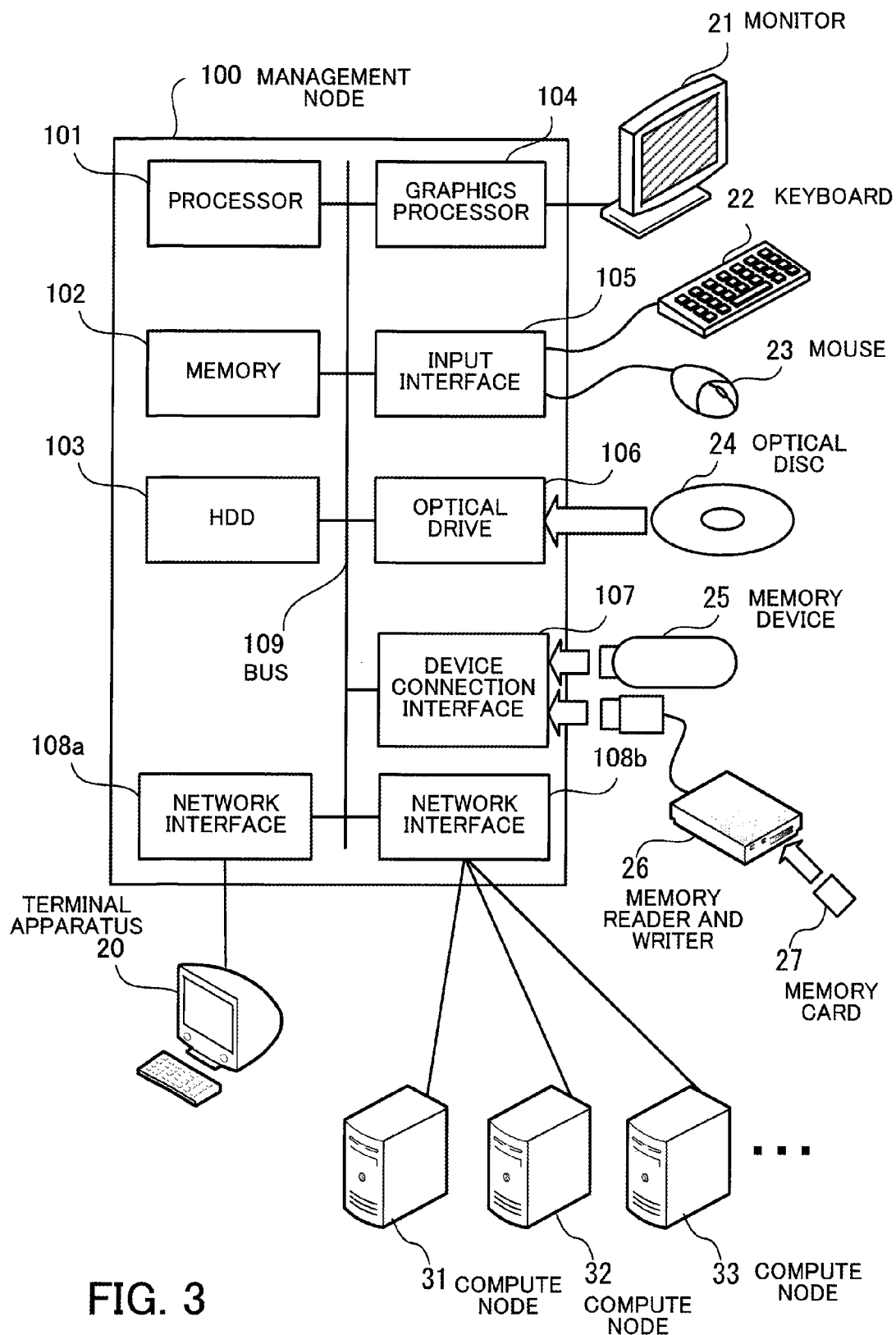
FIG. 3 illustrates an exemplary hardware configuration of a management node used in the second embodiment.

FIG. 3 illustrates an exemplary hardware configuration of the management node 100 used in the second embodiment. The entire operation of the management node 100 is controlled by a processor 101. A memory 102 and a plurality of peripheral devices are connected to the processor 101 via a bus 109. The processor 101 may be a multi-core processor. Examples of the processor 101 include a CPU, a micro processing unit (MPU), and a digital signal processor (DSP). The functions implemented by a program executed by the processor 101 may be implemented wholly or partly by using electronic circuits such as an application-specific integrated circuit (ASIC), a programmable logic device (PLD), and the like.

The memory 102 serves as a primary storage device of the management node 100. The memory 102 temporarily stores at least part of the operating system (OS) program and application programs that are executed by the processor 101. The memory 102 also stores various types of data needed for processing performed by the processor 101. Examples of the memory 102 include a volatile semiconductor storage device such as a random access memory (RAM) and the like.

The peripheral devices connected to the bus 109 include a hard disk drive (HDD) 103, a graphics processor 104, an input interface 105, an optical drive 106, a device connection interface 107, and network interfaces 108a and 108b.

The HDD 103 magnetically writes data to and reads data from its internal disk. The HDD 103 serves as a secondary storage device of the management node 100. The HDD 103 stores the OS program, application programs, and various types of data. Note that a non-volatile semiconductor storage device such as a flash memory and the like may be used as a secondary storage device.

A monitor 21 is connected to the graphics processor 104. The graphics processor 104 displays an image on the screen of the monitor 21 in accordance with an instruction from the processor 101. Examples of the monitor 21 include a display device using a cathode ray tube (CRT), a liquid crystal display device, and the like.

A keyboard 22 and a mouse 23 are connected to the input interface 105. The input interface 105 receives signals from the keyboard 22 and the mouse 23, and transmits the received signals to the processor 101. The mouse 23 is an example of a pointing device, and other types of pointing devices may also be used. Examples of other types of pointing devices include a touch panel, a tablet, a touch pad, a track ball, and the like.

The optical drive 106 reads data from an optical disc 24 by using laser beams or the like. The optical disc 24 is a portable storage medium and stores data such that the data may be read through optical reflection. Examples of the optical disc 24 include digital versatile disc (DVD), DVD- RAM, compact disc read only memory (CD-ROM), CD-Recordable (CD-R), CD-Rewritable (CD-RW), and the like.

The device connection interface 107 is a network interface that connects peripheral devices to the management node 100. For example, a memory device 25 and a memory reader and writer 26 may be connected to the device connection interface 107. The memory device 25 is a storage medium having a function to communicate with the device connection interface 107. The memory reader and writer 26 is a device that writes data to and reads data from a memory card 27. The memory card 27 is a card-type storage medium.

The network interface 108a is connected to the terminal apparatus 20 via a network. The network interface 108a exchanges data with the terminal apparatus 20.

The network interface 108b is connected to the compute nodes 31, 32, 33, and so on via a network. The network interface 108b exchanges data with the compute nodes 31, 32, 33, and so on.

With the hardware configuration described above, it is possible to realize the processing functions of the second embodiment. Note that the compute nodes 31, 32, 33, and so on may be realized with the same hardware configuration as the management node 100. The job scheduling apparatus 10 of the first embodiment may also be realized with the same hardware configuration as the management node 100 of FIG. 3.

The management node 100 realizes the processing functions of the second embodiment by executing a program stored in a computer-readable storage medium, for example. The program describing the procedure to be performed by the management node 100 may be stored in various storage media. For example, the program to be executed by the management node 100 may be stored in the HDD 103. The processor 101 loads at least part of the program from the HDD 103 into the memory 102 so as to execute the program. The program to be executed by the management node 100 may also be stored in a portable storage medium, such as the optical disc 24, the memory device 25, the memory card 27, and the like. The program stored in the portable storage medium may be executed after being installed into the HDD 103 under the control of, for example, the processor 101. Further, the processor 101 may execute the program by reading the program directly from the portable storage medium.

The following describes the functions of the management node 100 in detail.

Figure 4:
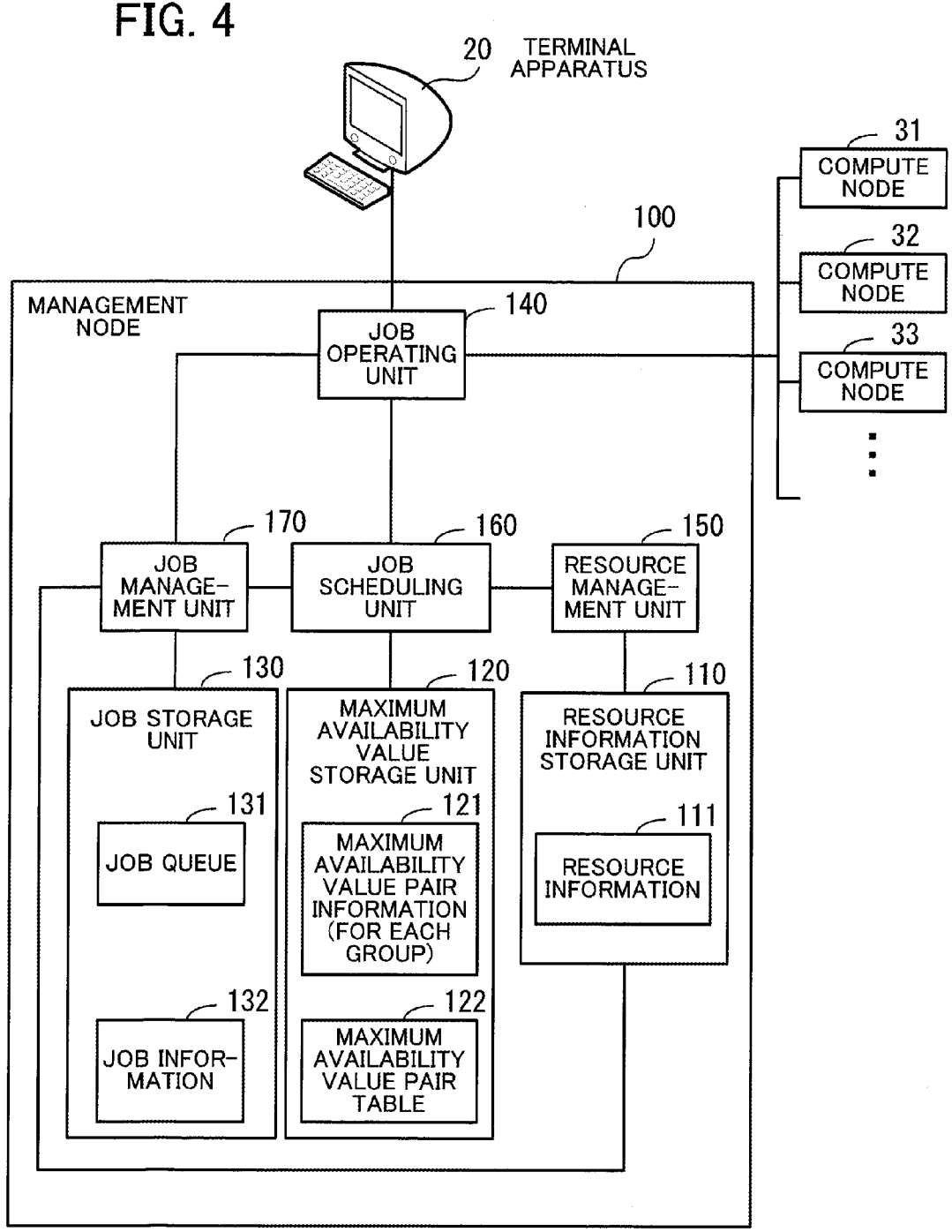
FIG. 4 is a block diagram illustrating functions of the management node.

FIG. 4 is a block diagram illustrating functions of the management node 100. The management node 100 includes a resource information storage unit 110, a maximum availability value storage unit 120, a job storage unit 130, a job operating unit 140, a resource management unit 150, a job scheduling unit 160, and a job management unit 170.

The resource information storage unit 110 stores resource information 111 on computational resources. For example, the resource information 111 includes the number of cores and the memory amount of each of the compute nodes 31, 32, 33, and so on. The resource information 111 also includes the number of available cores and the available memory amount in accordance with the operation status. The resource information 111 further includes information on the group to which each of the compute nodes 31, 32, 33, and so on belongs.

The maximum availability value storage unit 120 stores information on the availability of the computational resources. For example, the maximum availability value storage unit 120 stores maximum availability value pair information 121 and a maximum availability value pair table 122. The maximum availability value pair information 121 is provided for each group. The maximum availability value pair information 121 includes, for each type of resources, the compute node having the greatest amount of available resources among the compute nodes of the group, and the value (maximum value) indicating the available resource amount in the compute node. The maximum availability value pair table 122 is a data table that manages the number of groups, for each pair (maximum available value pair) of the maximum number of available cores and the maximum available memory amount.

The job storage unit 130 stores information on the job to be executed. The job storage unit 130 stores, for example, a job queue 131 and the job information 132. The job queue 131 is a queue in which jobs that are requested to be executed are arranged in the order of request. The job information 132 is information indicating the processing content of the job to be executed. The job information 132 includes the number of cores and the amount of memory used for executing the job.

The job operating unit 140 transmits an execution instruction of a job that is requested to be executed to a compute node. For example, the job operating unit 140 receives an execution request of a job from the terminal apparatus 20, and transfers the execution request to the job management unit 170. Further, the job operating unit 140 acquires job information on the job to be executed from the job management unit 170 in accordance with a job execution schedule determined by the job scheduling unit 160, and transmits an execution instruction of the job to a compute node.

The resource management unit 150 manages the availability of the resources. For example, the resource management unit 150 acquires the availability of the resources of each compute node from the resource information 111, in response to a request from the job scheduling unit 160. Then, the resource management unit 150 returns the availability of each compute node to the job scheduling unit 160.

The job scheduling unit 160 performs job scheduling. For example, upon receiving from the job operating unit 140 an execution instruction for instructing a compute node to execute a job or a notice of occurrence of an event in which execution of a job is completed by a compute node, the job scheduling unit 160 schedules a job. When scheduling a job, the job scheduling unit 160 refers to the maximum availability value storage unit 120, searches for a compute node that has the available resource amount corresponding to the amount of resources used for executing the job, and assigns a job to be executed to the resources of the compute node. In this step, the job scheduling unit 160 performs grouping by dividing compute nodes into groups. Thus, the job scheduling unit 160 determines, for each of the groups, whether the group is likely to include a compute node to which the job may be assigned, based on the maximum availability value pair information 121. Then, the job scheduling unit 160 selects, as a search object group in which the assignment destination resources are searched for, only a group that is determined to be likely to include a compute node to which the job may be assigned.

Having selected the search objet group, the job scheduling unit 160 acquires the availability of the resources of the compute nodes in the search object group from the resource management unit 150, and searches for a compute node that has the amount of available resources corresponding to the amount of resources used by the job. Then, the job scheduling unit 160 assigns the job to the resources of the compute node that has the amount of available resources corresponding to the amount of resources used by the job. When the assignment of the job to the resources of the compute node is determined, the job scheduling unit 160 reports information on the job assignment destination resources to the job operating unit 140.

Further, the job scheduling unit 160 periodically calculates the optimum number of compute nodes per group. For example, the job scheduling unit 160 calculates the number of compute nodes per group that minimizes the time needed for scheduling, and determines the calculated number of nodes as the optimum number of compute nodes per group. After calculating the optimum number of compute nodes per group, the job scheduling unit 160 performs regrouping of compute nodes.

The job management unit 170 manages the job queue 131 and the job information 132. For example, the job management unit 170 submits a job requested to be executed to the job queue 131. In this step, the job management unit 170 stores the job information 132 on the job requested to be executed in the job storage unit 130. Further, when the job scheduling unit 160 schedules a job, the job management unit 170 reports job information on the job registered in the job queue 131 to the job scheduling unit 160.

Note that the lines connecting the components in FIG. 4 represent some of communication paths. Communication paths other than those of FIG. 4 may be provided. Further, the functions of each component illustrated in FIG. 4 may be realized by, for example, causing a computer to execute a program module corresponding to the component.

The following describes the resource information 111 in detail.

FIG. 5 illustrates an example of the resource information 111. In the resource information 111, the group number, the number of cores, the number of available cores, the memory amount, and the available memory amount are registered in association with the node number. The node number is an identification number of each compute node. The group number is an identification number of the group to which the compute node belongs. The number of cores is the number of cores included in the compute node. The number of available cores is the number of cores of the compute node to which no job is assigned. The memory amount is the storage capacity of the main memory mounted on the compute node. The available memory amount is the available capacity of the main memory of the compute node. The available memory amount is represented in percentage of the available capacity with respect to the storage capacity of the main memory of the compute node.

The following describes the maximum availability value pair information 121 in detail.

FIG. 6 illustrates an example of the maximum availability value pair information 121. In the maximum availability value pair information 121, a pair (a maximum availability value pair) of the maximum number of available cores and the maximum available memory amount are registered in association with the group number. The maximum number of available cores is the number of available cores of the compute node having the greatest number of available cores among the compute nodes belonging to the corresponding group. The maximum available memory amount is the available memory amount of the compute node having the greatest available memory amount among the compute nodes belonging to the corresponding group.

Figure 7:
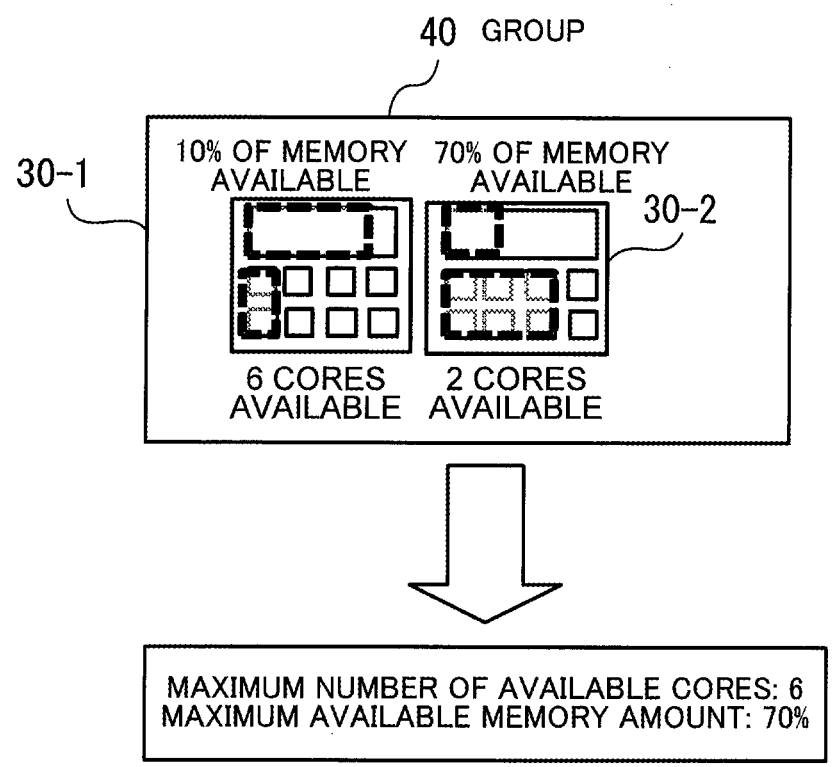
FIG. 7 illustrates an example of a maximum availability value pair of a group.

FIG. 7 illustrates an example of a maximum availability value pair of a group. In FIG. 7, two compute nodes 30-1 and 30-2 belong to a group 40. As for the compute node 30-1, the number of available cores is 6, and the available memory amount is 10%. As for the compute node 30-2, the number of available cores is 2, and the available memory amount is 70%. In this case, the compute node 30-1 has the greatest number of available cores among the compute nodes 30-1 and 30-2 of the group 40. Accordingly, the maximum number of available cores of the group 40 is 6. Further, the compute node 30-2 has the greatest available memory amount among the compute nodes 30-1 and 30-2 of the group 40. Accordingly, the maximum available memory amount of the group 40 is 70%. As is understood from the above, there are cases where the value of the maximum number of available cores and the value of the maximum available memory amount are values extracted from different compute nodes.

The following describes the maximum availability value pair table 122 in detail.

FIG. 8 illustrates an example of the maximum availability value pair table 122. The maximum availability value pair table 122 is a two-dimensional frequency distribution table representing the appearance frequency in each value range on a per-resource-type basis.

Each row of the maximum availability value pair table 122 represents a maximum number of available cores. Further, each column of the maximum availability value pair table 122 represents a range of the maximum available memory amount. In FIG. 8, the maximum available memory value is classified into ranges increasing in increments of 10%. Each column of the maximum availability value pair table 122 is labeled with the maximum value of the corresponding range of the maximum available memory amount. For example, the column labeled with the maximum available memory amount "10%" corresponds to a group whose maximum available memory amount is 10% or less. The column labeled with the maximum available memory amount "20%" corresponds to a group whose maximum available memory amount is greater than 10% or less than or equal to 20%.

Each cell where a row and a column intersect stores the number of groups that have a maximum availability value pair including the maximum number of available cores represented by the row and a value of the maximum available memory amount represented by the column. The values in the maximum availability value pair table 122 are updated each time an event occurs in which a job execution is started or completed.

With the system described above, job scheduling is performed. In the second embodiment, grouping of compute nodes is performed prior to job scheduling.

Figure 9:
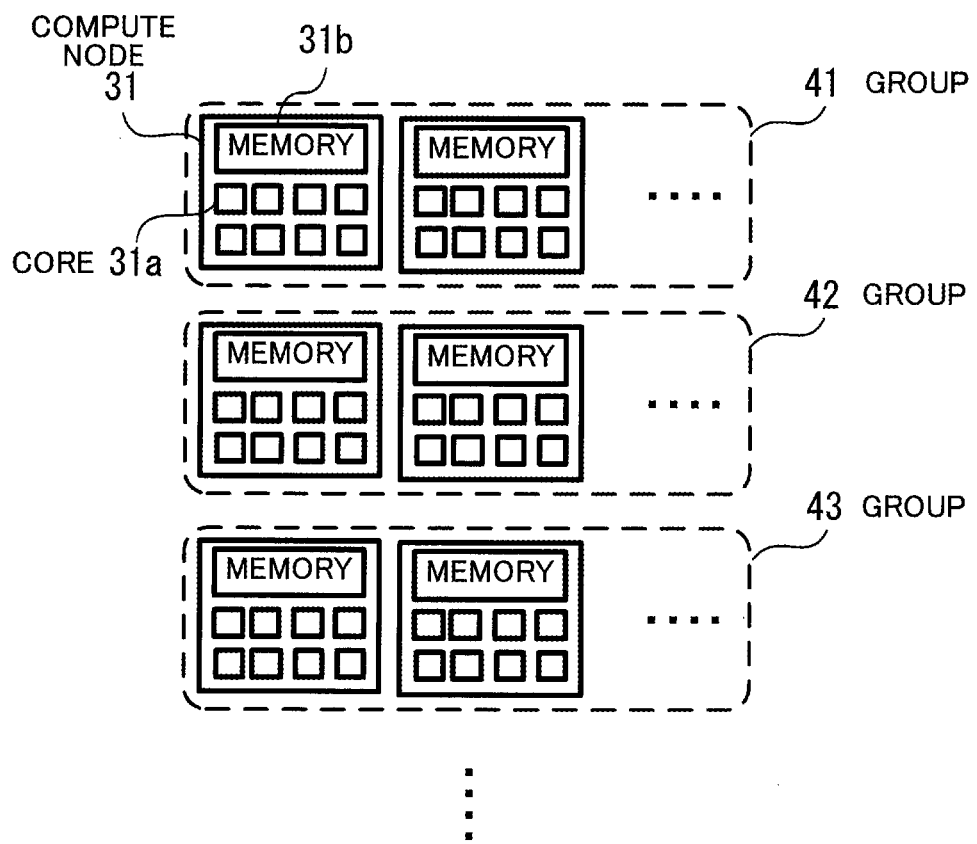
FIG. 9 illustrates an example of grouping of compute nodes.

FIG. 9 illustrates an example of grouping of compute nodes. Each of the compute nodes in the system is classified in to one of the plurality of groups 41, 42, 43, and so on. For example, the compute node 31 belongs to the group 41. Note that the compute node 31 includes a plurality of cores 31a and a memory 31b. Likewise, each of other compute nodes includes a plurality of cores and a memory.

Further, in the second embodiment, the compute node to which a job is assigned is selected in view of the number of available cores and the available memory amount of each compute node. In this step, the likelihood that there is a compute node to which a job may be assigned is determined for each group based on the maximum availability value pair. Then, only the group that is likely to include such a compute node is selected as a search object in which the assignment destination compute node is searched for.

Figure 10:
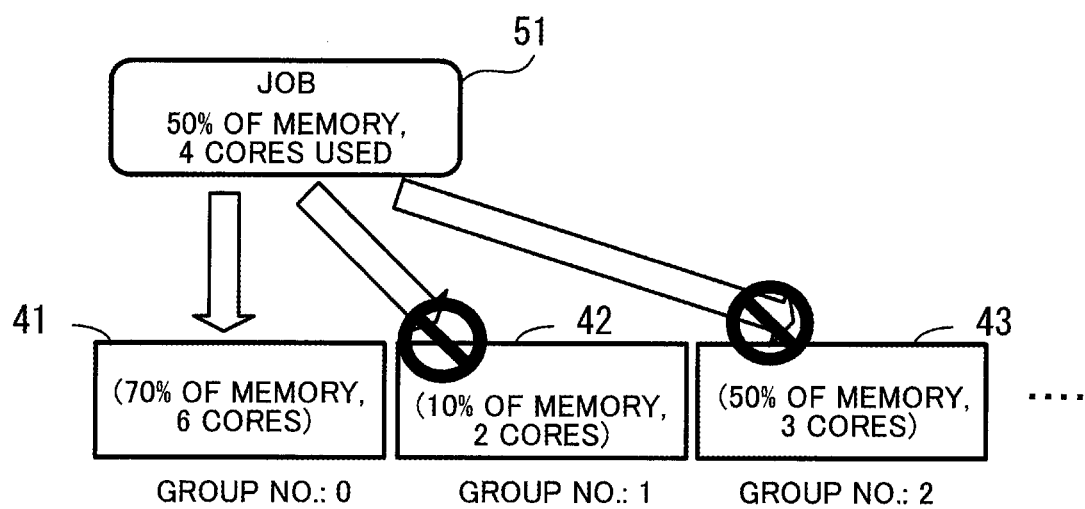
FIG. 10 illustrates an example of determining a search object group.

FIG. 10 illustrates an example of determining a search object group. In the example of FIG. 10, the assignment destination of a job 51 that uses 50% of the memory and four cores is searched for.

As for the group 41, the maximum available memory amount is 70%, and the maximum number of available cores is 6. That is, the group 41 is likely to include a compute node capable of executing the job 51. Thus, the group 41 is selected as a search object in which an assignment destination compute node is searched for.

As for the group 42, the maximum available memory amount is 10%, and the maximum number of available cores is 2. That is, the group 42 does not include a compute node whose available memory amount is 50% or greater or a compute node whose number of available cores is 4 or greater. Thus, the group 42 is not likely to include a compute node capable of executing the job 51. As a result, the group 42 is excluded from search objects in which an assignment destination compute node is searched for.

As for the group 43, the maximum available memory amount is 50%, and the maximum number of available cores is 3. That is, the group 43 includes a compute node whose available memory amount is 50% or greater, but does not include a compute node whose number of available cores is 4 or greater. Thus, the group 43 is not likely to include a compute node capable of executing the job 51. As a result, the group 43 is excluded from search objects in which an assignment destination compute node is searched for.

In this manner, groups that are not likely to include a compute node capable of executing the job 51 are filtered out from the plurality of groups. The filtered out groups are not selected as search objects in which an assignment destination compute node for the job is searched for. This reduces the number of compute nodes for which a determination of whether a compute node is capable of executing the job 51 is made.

Figure 11:
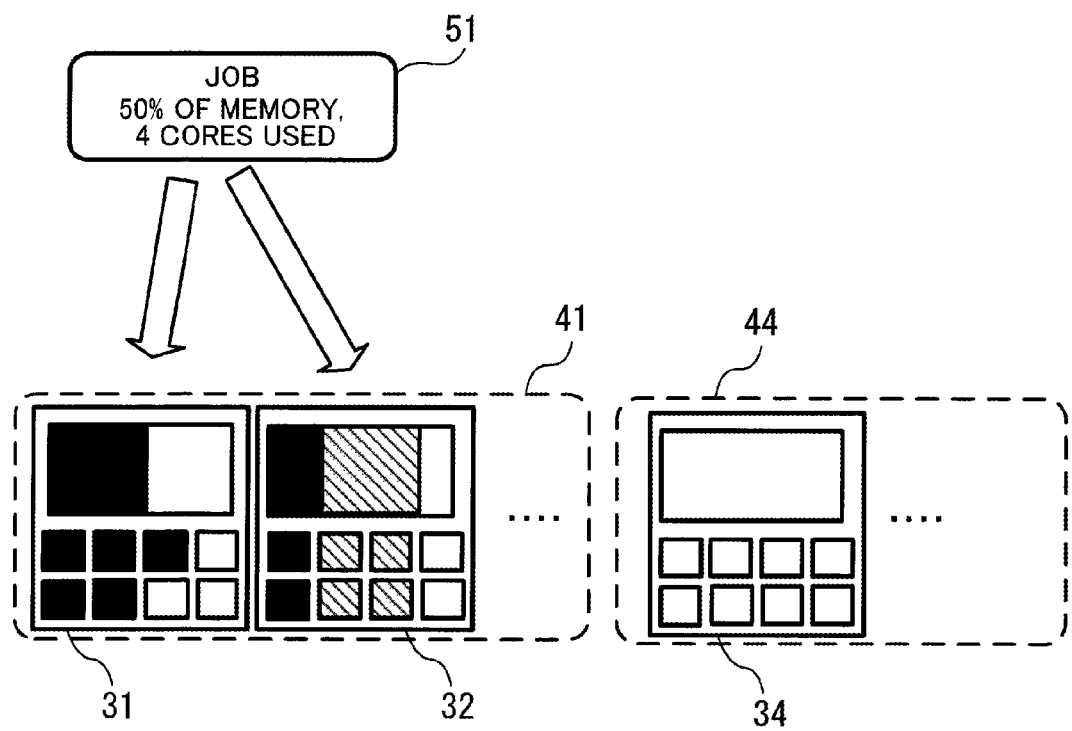
FIG. 11 illustrates an example of examining compute nodes in the search object group.

FIG. 11 illustrates an example of examining compute nodes in the search object group 41. In the example of FIG. 11, the compute nodes 31, 32, and so on of the group 41 are examined sequentially in this order on whether the job 51 may be assigned. Examining whether the job 51 may be assigned includes examining whether both the number of available cores and the available memory amount of the compute node satisfy the conditions on the amount used for executing the job 51. In FIG. 11, among the compute nodes 31, 32, ..., 34, and so on, the resources in use are indicated in black, and the available resources are indicated in white. The resources indicated by hatching are those allocated to the job 51.

As for the compute node 31 at the top of the group 41, the number of available cores is 3, and the available memory amount is 50%. That is, the compute node is not capable of executing the job that uses four cores. As for the following compute node 32, the number of available cores is 6, and the available memory amount is 70%. That is, the compute node 32 satisfies the conditions on resources used for executing the job 51. Thus, the job 51 is assigned to the resources of the compute node 32.

When the assignment of the job 51 to the resources is determined, the resource search ends. Accordingly, even if there is the compute node 34 in a group 44 as a resource search object, a resource examination is not performed on the compute node 34 once the job 51 is assigned to the resources of the compute node 32.

Note that there may be a case in which it is more efficient to select all the compute nodes as search objects rather than to filter out groups that are not likely to include a compute node capable of executing the job 51. In view of this, in the second embodiment, filtering of search object groups is performed only when it is more efficient to perform such filtering. The following describes the scheduling cost of each scheduling method with reference to FIGS. 12 and 13.

Figure 12:
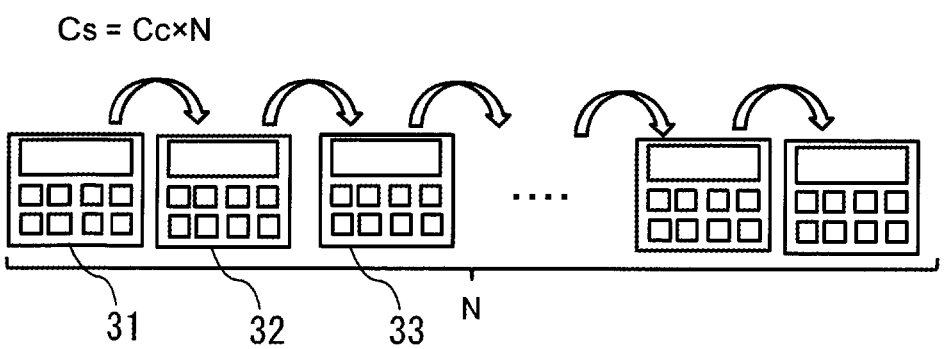
FIG. 12 illustrates the scheduling cost in the case where all the compute nodes are examined.

FIG. 12 illustrates the scheduling cost in the case where all the compute nodes are examined. For example, it is assumed that there are N (N is an integer greater than or equal to 1) compute nodes in a system. It is also assumed that the examination cost per compute node is Cc (Cc is a positive real number). The examination cost is represented by the time needed to determine whether the compute node has available resources sufficient to execute a job. Here, the worst case is assumed, and all the compute nodes are examined. Then, a scheduling cost $Cs_1$ ($Cs_1$ is a positive real numbers) is expressed by the following formula (1):

$$Cs_1 = Cc \times N \tag{1}$$

Figure 13:
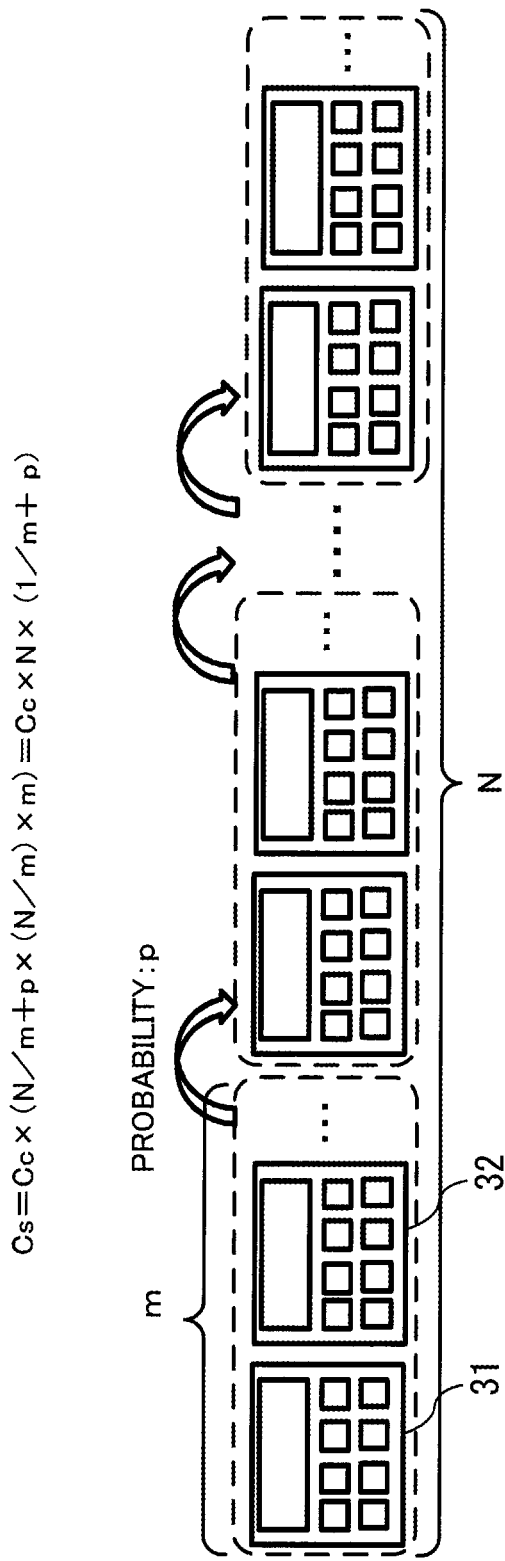
FIG. 13 illustrates the scheduling cost in the case where filtering of search object groups is performed.

FIG. 13 illustrates the scheduling cost in the case where filtering of search object groups is performed. Here, the number of nodes per group after grouping is m (m is an integer greater than or equal to 2).

The probability that each group is subjected to an examination for determining an assignment destination is p (p is a real number greater than or equal to 0 and less than or equal to 1). The examination cost per group needed to determine the likelihood that a group includes a compute node to which a job may be assigned is equal to the examination cost Cc per compute node. Here, the number of groups in the entire system is "N/m". That is, a determination of the likelihood that a group includes a compute node to which a job may be assigned is performed "N/m" times.

Further, the number of search object groups in which an assignment destination is searched for is "p×(N/m)". That is, the search process for searching for a compute node in a group occurs "p×(N/m)" times. There are m compute nodes in each group. Therefore, in the search process for searching for a compute node in a group, an examination of whether a compute node has resources sufficient to execute a job is performed m times per group.

Then, a scheduling cost $Cs_2$ ($Cs_2$ is a positive real number) is expressed by the following formula (2):

$$Cs_2 = Cc \times (N/m + p \times (N/m) \times m) = Cc \times N \times (1/m + p) \tag{2}$$

Then, $Cs_1$ obtained by the formula (1) and $Cs_2$ obtained by the formula (2) are compared. If $Cs_1$ is less, it is more efficient to examine all the compute nodes. On the other hand, if $Cs_2$ is less, it is more efficient to perform filtering of search object groups and examine only the compute nodes in a group determined to be a search object. Note that $Cs_2$ is less when "$Cc \times N \times (1/m + p) < Cc \times N$" is satisfied. This comparison expression is simplified as "$1/m + p < 1$". Accordingly, in the case where "$1/m + p < 1$" is satisfied, $Cs_2$ is less than $Cs_1$, and therefore it is more efficient to perform filtering of search object groups and examine only the compute nodes in a group determined to be a search object.

Note that the p-value is calculated when performing job scheduling. The p-value may be calculated based on the maximum availability value pair table 122.

Figure 14:
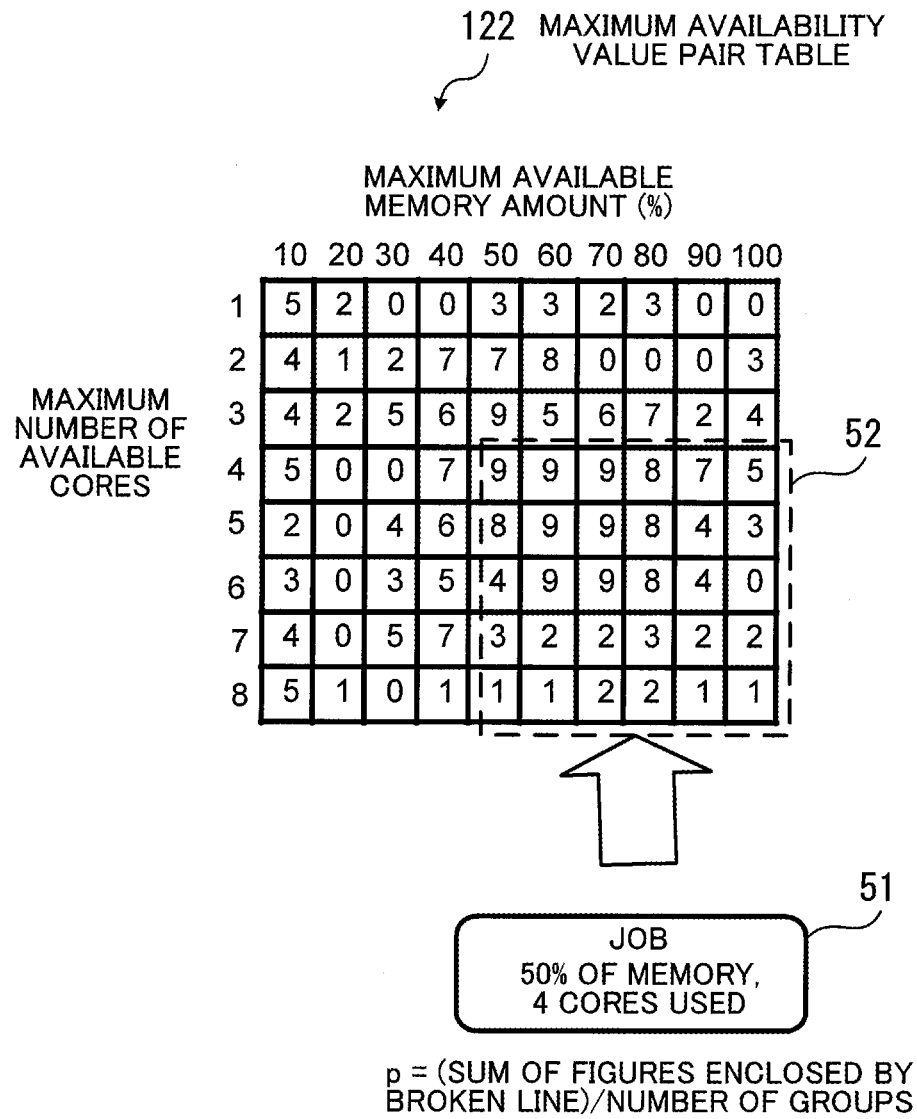
FIG. 14 illustrates an example of calculating a p-value.

FIG. 14 illustrates an example of calculating the p-value. For example, for executing the job 51, four cores are used and 50% of the memory is consumed. That is, if a group has a maximum availability value pair in which the maximum number of available cores is greater than or equal to 4 and the maximum available memory amount is greater than or equal to 50%, the group is likely to include a compute node to which the job 51 may be assigned. The number of such groups may be easily calculated from the maximum availability value pair table 122. In the example of FIG. 14, the number of such groups is calculated by adding up figures enclosed by a broken line 52. Then, the p-value is obtained by dividing the number of groups that are likely to include a compute node to which the job 51 may be assigned by the total number of groups.

The m-value is updated at predetermined intervals. For example, the optimum m-value is calculated at one-hour intervals. The calculated optimum m-value is used as the m-value in the subsequent job scheduling. When the m-value is updated, the number of compute nodes per group changes. Thus, regrouping of compute nodes is performed.

Figure 15:
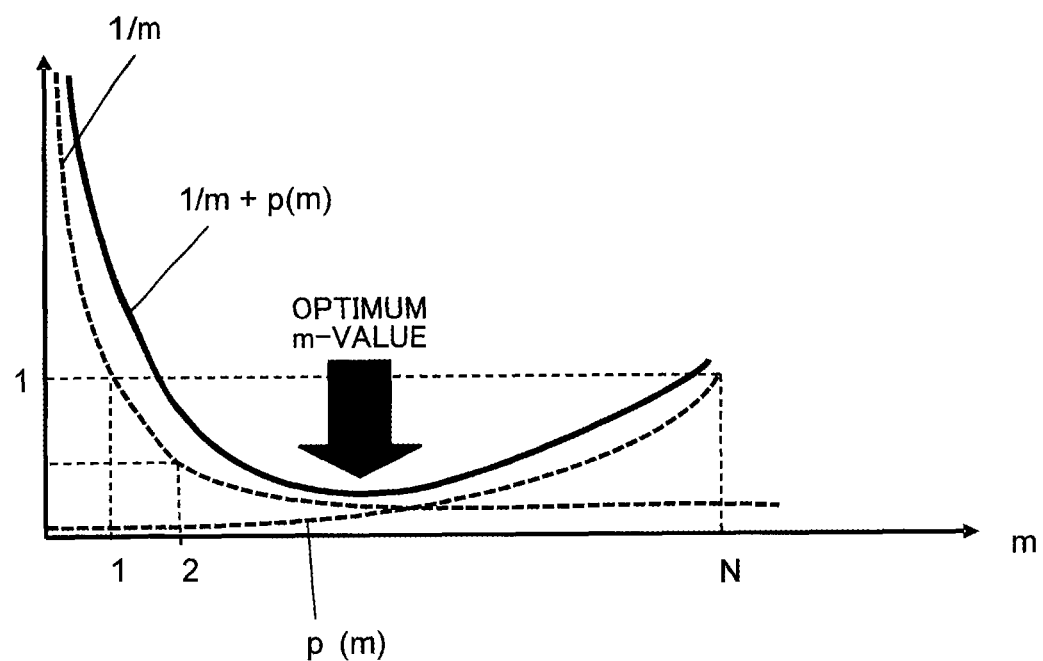
FIG. 15 illustrates an example of calculating an optimum m-value.

FIG. 15 illustrates an example of calculating the optimum m-value. The optimum m-value is an m-value that minimizes $1/m+p(m)$, in which $p(m)$ is a function for calculating the p-value while using an m-value in the range from 2 to N/2. Note that the p-value is dependent on the number of cores and the amount of memory used by the job. Thus, for calculating the optimum m-value, a tentative job is assumed, and $p(m)$ is obtained based on the number of cores and the amount of memory used by the job. For example, the maximum value of the number of cores to be used and the maximum value of the amount of memory to be used by each waiting job on the job queue 131 are set as the number of cores used and the amount of memory used, respectively, when calculating the $p(m)$.

When the number of cores and the amount of memory used by the job are fixed, $p(m)$ is an increasing function of the m-value. Then, "$1/m+p(m)$" is represented by the graph of FIG. 15. The m-value that gives the minimum value on the curve representing "$1/m+p(m)$" is the optimum m-value.

In this way, the optimum m-value is calculated periodically, and regrouping of compute nodes is performed. Therefore, even when the request conditions of jobs change, it is possible to perform job scheduling using a method and an m-value that are appropriate at the time.

The following describes the procedure of job schedule in detail.

Figure 16:
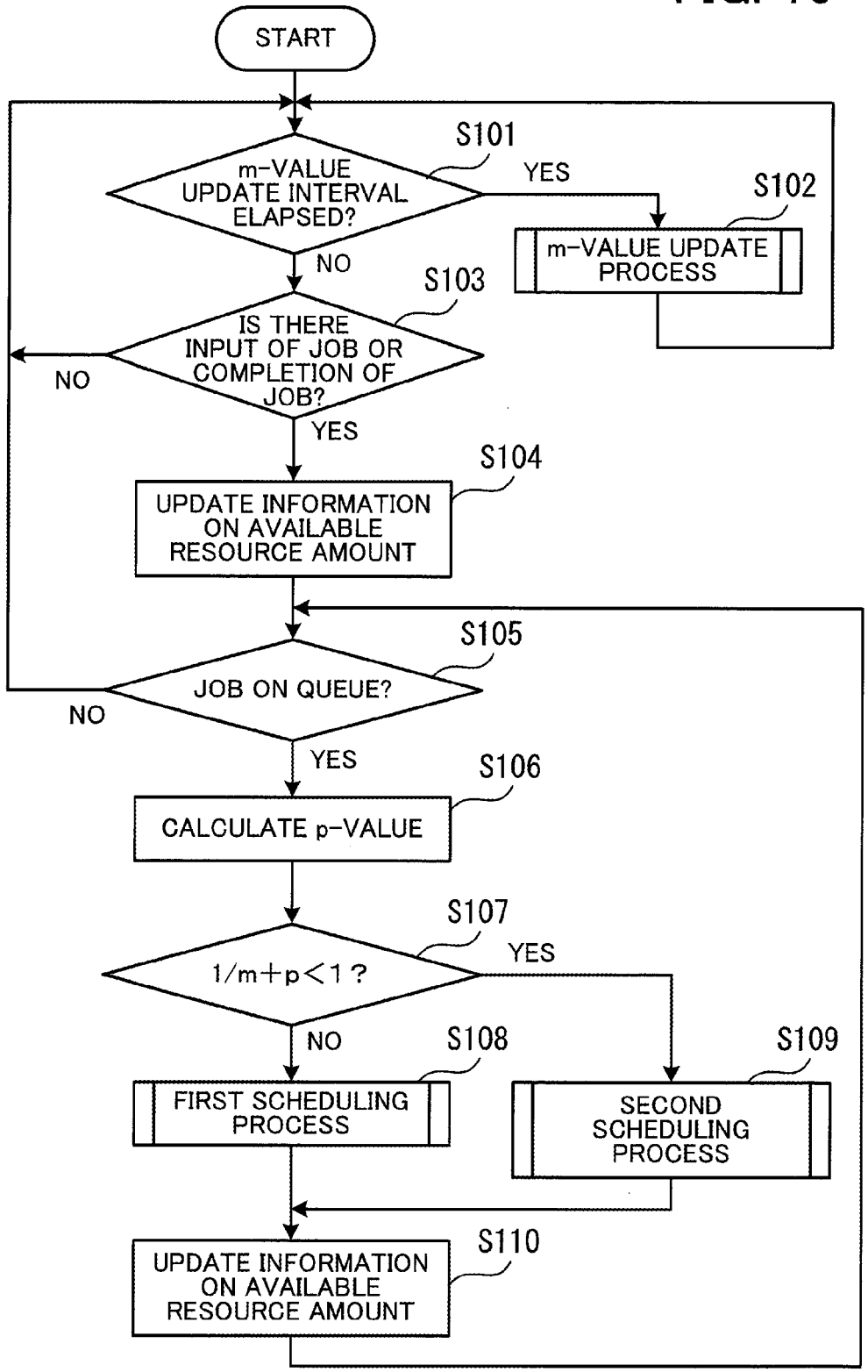
FIG. 16 is a flowchart illustrating an exemplary procedure of job scheduling.

FIG. 16 is a flowchart illustrating an exemplary procedure of job scheduling.

(Step S101) The job scheduling unit 160 determines whether the update interval of the m-value has elapsed since the last update of the m-value. If the m-value update interval has elapsed, the process proceeds to step S102. If the m-value update interval has not elapsed, the process proceeds to step S103.

(Step S102) The job scheduling unit 160 performs an m-value update process. Note that this process will be described below in greater detail (see FIG. 19). When the m-value update process ends, the process returns to step S101.

(Step S103) The job scheduling unit 160 determines whether there is an input of a job or completion of a job. For example, when a job is input from the terminal apparatus 20, the job operating unit 140 reports to the job scheduling unit 160 that a job is input. Further, upon receiving a report of completion of job execution from a compute node, the job operating unit 140 reports to the job scheduling unit 160 that a job is completed. The job scheduling unit 160 having received such a report from the job operating unit 140 recognizes an input of a job or completion of a job. If there is an input of a job or completion of a job, the process proceeds to step S104. If there is not an input of a job or completion of a job, the process returns to step S101.

(Step S104) When there is an input of a job or completion of a job, the job scheduling unit 160 updates the maximum availability value pair information 121 and the maximum availability value pair table 122. For example, when a job is completed, the job management unit 170 updates, in the resource information 111, the number of available cores and the available memory amount of the compute node having the resources to which the job is assigned. The job scheduling unit 160 refers to the resource information 111, and updates, in the maximum availability value pair information 121, the maximum number of available cores and the maximum available memory amount of the group that includes the compute node whose number available cores and available memory amount are updated. Further, the job scheduling unit 160 updates the maximum availability value pair table 122 based on changes in the maximum availability value pair information 121. For example, the job scheduling unit 160 subtracts 1 from the value in the maximum availability value pair table 122 corresponding to the maximum availability value pair before change, for the group subjected to the change. Further, the job scheduling unit 160 adds 1 to the value in the maximum availability value pair table 122 corresponding to the maximum availability value pair after change, for the group subjected to the change.

(Step S105) The job scheduling unit 160 determines whether a job that is not scheduled is registered in the job queue 131. If there is such a job, the process proceeds to step S106. If there is no such job, the process returns to step S101.

(Step S106) If there is a non-scheduled job in the job queue 131, the job scheduling unit 160 calculates a p-value corresponding to the number of cores and the amount of memory used by the job.

(Step S107) The job scheduling unit 160 determines whether the comparison expression "$1/m+p<1$" is satisfied. This comparison expression is an expression for determining whether the p-value is less than a predetermined value "$1-1/m$". If the comparison expression is satisfied, the process proceeds to step S109. If the comparison expression is not satisfied, the process proceeds to step S108.

(Step S108) If the comparison expression "$1/m+p<1$" is not satisfied (if the p-value is greater than or equal to the predetermined value), the job scheduling unit 160 performs a first job scheduling process that involves examining all the compute nodes. This process will be described below in greater detail (see FIG. 17). Then, the process proceeds to step S110.

(Step S109) If the comparison expression "$1/m+p<1$" is satisfied (if the p-value is less than the predetermined value), the job scheduling unit 160 performs a second job scheduling process that involves filtering of search object groups. This process will be described below in greater detail (see FIG. 18).

(Step S110) The job scheduling unit 160 updates the maximum availability value pair information 121 and the maximum availability value pair table 122 based on the assignment results in step S108 or step S109. The procedure of update is the same as that described in step S104. Then, the process returns to step S105.

The following describes the procedure of the first job scheduling process.

Figure 17:
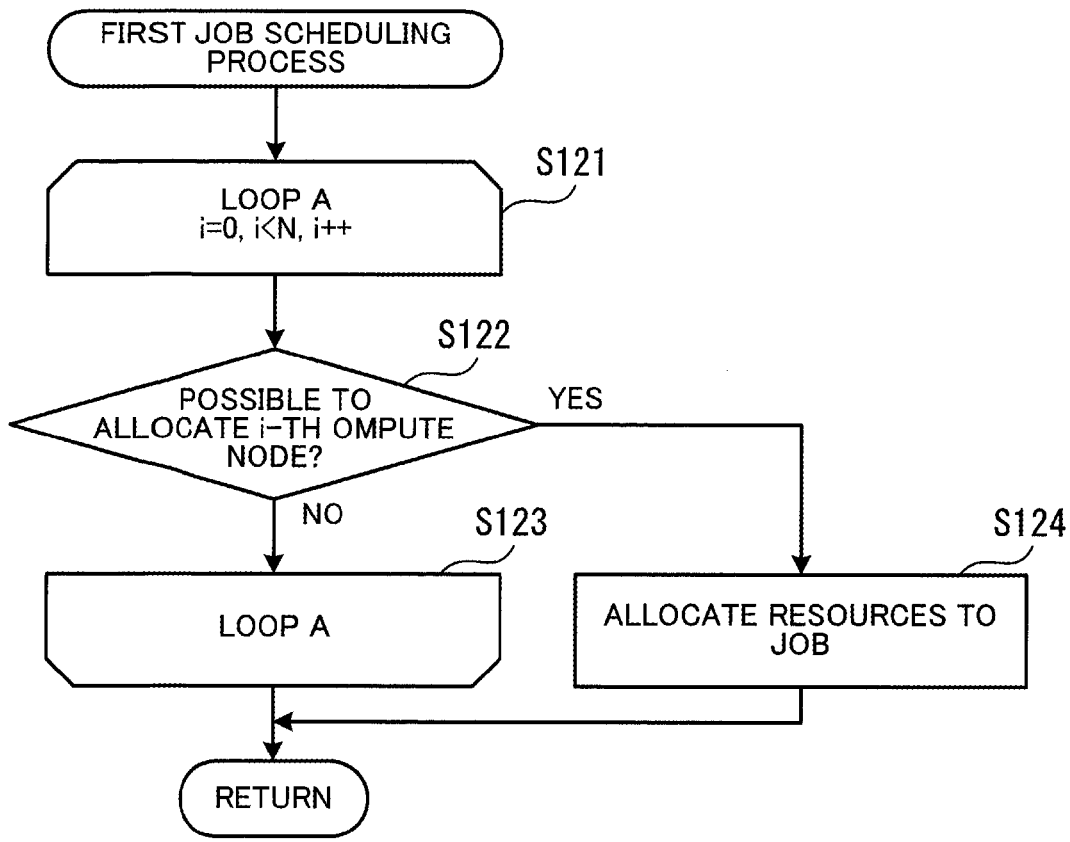
FIG. 17 is a flowchart illustrating an exemplary procedure of a first job scheduling process.

FIG. 17 is a flowchart illustrating an exemplary procedure of the first job scheduling process.

(Step S121) The job scheduling unit 160 sets a variable i to the initial value "0". Then, the job scheduling unit 160 repeats the processing of step S122 until a predetermined end condition is satisfied (Loop A).

(Step S122) Each time the value of i is updated, the job scheduling unit 160 determines whether it is possible to assign the job to the resources of an i-th compute node. For example, the job scheduling unit 160 acquires the number of available cores and the available memory amount of the compute node with the node number i from the resource information 111. Subsequently, the job scheduling unit 160 compares the acquired information with the amount of resources used by a job to be scheduled. Then, if the i-th compute node has the amount of available resources corresponding to the amount of resources used by the job, the job scheduling unit 160 determines that it is possible to assign the job to the resources of the i-th compute node. If it is possible to assign the job, the process exits the Loop A and proceeds to step S124. If it is not possible to assign the job, the process proceeds to step S123.

(Step S123) The job scheduling unit 160 increments the value of i. Then, if the job scheduling unit 160 determines that the incremented value of i satisfies the condition that "i is less than N (i<N)", the processing of step S122 is repeated. If the condition that "i is less than N" is not satisfied, the process exits the Loop A, and thus the first job scheduling process ends.

(Step S124) The job scheduling unit 160 assigns the job to be scheduled to the resources of the i-th compute node. Then, the first job scheduling process ends.

The following describes the procedure of the second job scheduling process.

Figure 18:
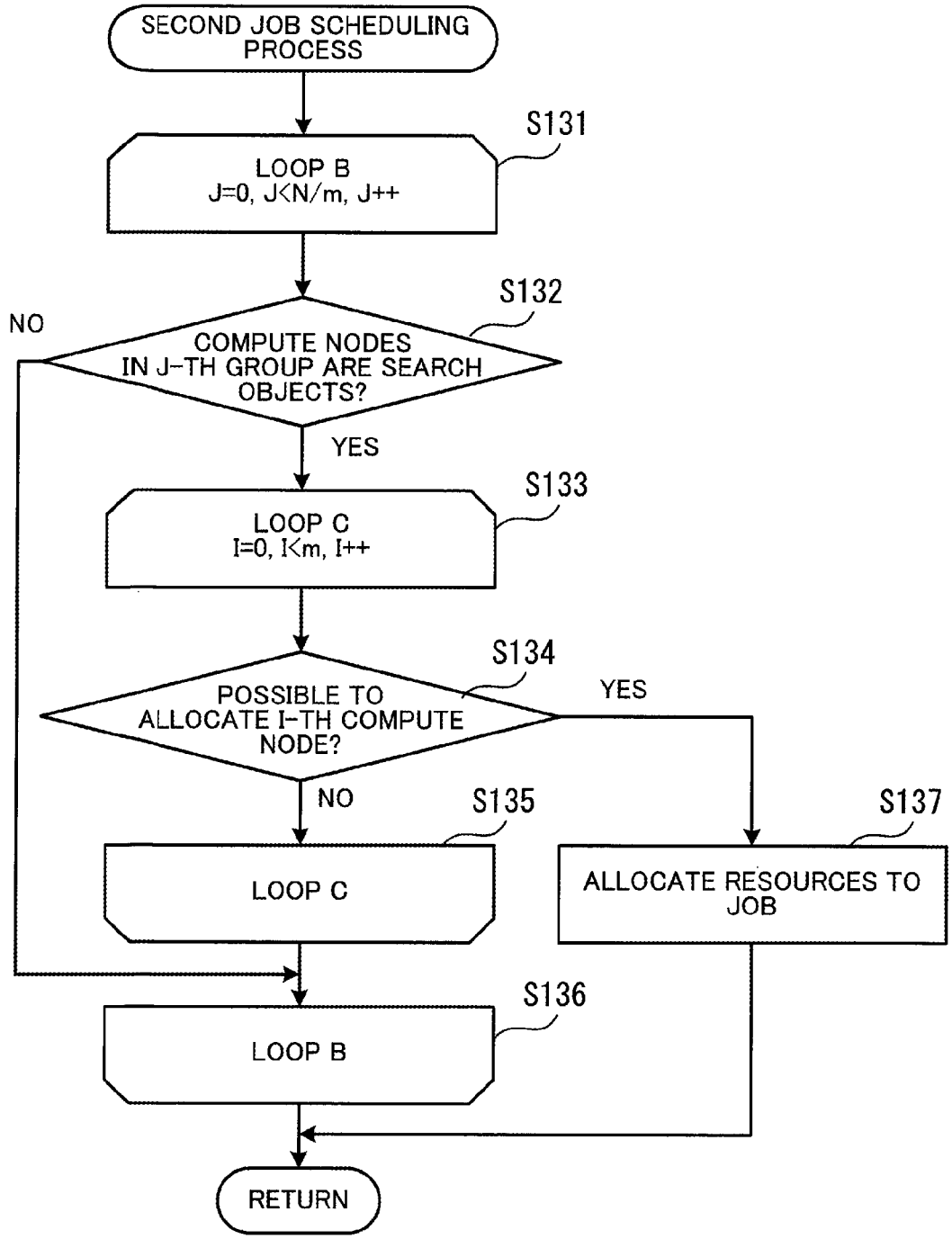
FIG. 18 is a flowchart illustrating an exemplary procedure of a second job scheduling process.

FIG. 18 is a flowchart illustrating an exemplary procedure of the second job scheduling process.

(Step S131) The job scheduling unit 160 sets a variable J to the initial value "0". Then, the job scheduling unit 160 repeats the processing of steps S132 through S135 until a predetermined end condition is satisfied (Loop B).

(Step S132) The job scheduling unit 160 determines whether the compute nodes in a J-th group are search objects. For example, the job scheduling unit 160 acquires the maximum availability value pair of the group with the group number J from the maximum availability value pair information 121. Subsequently, the job scheduling unit 160 compares the acquired information with the amount of resources used by a job to be scheduled. Then, if the maximum number of available cores of the J-th group is greater than or equal to the number of cores used by the job and the maximum available memory amount of the J-th group is greater than or equal to the amount of memory used by the job, the job scheduling unit 160 determines that the compute nodes in the J-th group are search objects. On the other hand, if the maximum number of available cores of the J-th group is less than the number of cores used by the job, the job scheduling unit 160 determines that the compute nodes in the J-th group are not search objects. Also, if the maximum available memory amount of the J-th group is less than the amount of memory used by the job, the job scheduling unit 160 determines that the compute nodes in the J-th group are not search objects. If the compute nodes in the J-th group are search objects, the process proceeds to step S133. If the compute nodes in the J-th group are not search objects, the process proceeds to step S136.

(Step S133) The job scheduling unit 160 assigns identification numbers to the compute nodes in the group determined to be search objects. Further, the job scheduling unit 160 sets a variable I to the initial value "0". Then, the job scheduling unit 160 repeats the processing of step S134 until a predetermined end condition is satisfied (Loop C).

(Step S134) Each time the value of I is updated, the job scheduling unit 160 determines whether it is possible to assign the job to the resources of an I-th compute node in the J-th group. For example, the job scheduling unit 160 acquires the number of available cores and the available memory amount of the I-th compute node from the resource information 111. Subsequently, the job scheduling unit 160 compares the acquired information with the amount of resources used by a job to be scheduled. Then, if the I-th compute node has the amount of available resources corresponding to the amount of resources used by the job, the job scheduling unit 160 determines that it is possible to assign the job to the resources of the I-th compute node. If it is possible to assign the job, the process exits the Loop B and the Loop C and proceeds to step S137. If it is not possible to assign the job, the process proceeds to step S135.

(Step S135) The job scheduling unit 160 increments the value of I. Then, if the job scheduling unit 160 determines that the incremented value of I satisfies the condition that "I is less than m (I<m)", the processing of step S134 is repeated. If the condition that "I is less than m" is not satisfied, the process exits the Loop C and proceeds to step S136.

(Step S136) The job scheduling unit 160 increments the value of J. Then, if the job scheduling unit 160 determines that the incremented value of J satisfies the condition that "J is less than N/m (J<N/m)", the processing of steps S132 through S135 is repeated. If the condition that "J is less than N/m" is not satisfied, the process exits the Loop B, and thus the second job scheduling process ends.

The following describes the procedure of an m-value update process.

Figure 19:
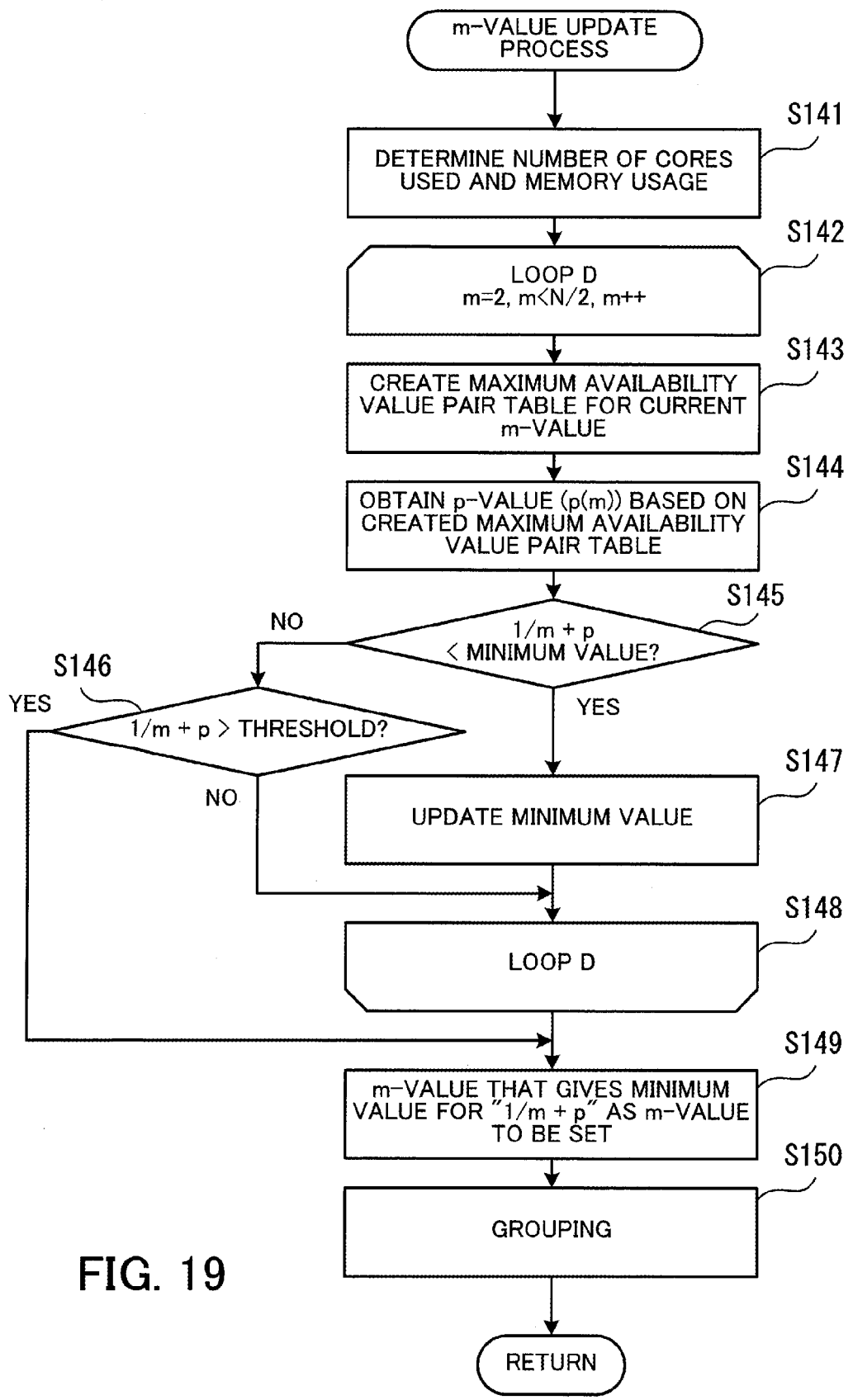
FIG. 19 is a flowchart illustrating an exemplary procedure of an m-value update process.

FIG. 19 is a flowchart illustrating an exemplary procedure of the m-value update process.

(Step S141) The job scheduling unit 160 determines the number of cores used and the memory usage which are to be set for calculating the p(m). For example, the job scheduling unit 160 statistically processes the number of cores and the amount of memory to be used by each of the waiting jobs on the job queue 131. The job scheduling unit 160 obtains the greatest number of cores to be used among the waiting jobs and the greatest amount of memory to be used among the waiting jobs. Then, the job scheduling unit 160 determines a pair of the greatest number of cores and the greatest amount of memory to be used as a pair of the number of cores and the amount of memory to be set for calculating the p(m).

(Step S142) The job scheduling unit 160 sets a variable m representing a candidate for the m-value to the initial value 2. Then, the job scheduling unit 160 repeats the processing of steps S142 through S147 until a predetermined end condition is satisfied (Loop D).

(Step S143) The job scheduling unit 160 creates a maximum availability value pair table for the current m-value. For example, the job scheduling unit 160 performs grouping of compute nodes while setting the number of compute nodes per group to m. Subsequently, the job scheduling unit 160 obtains the maximum availability value pair of each group. Then, the job scheduling unit 160 counts, for each pair of the number of available cores and the available memory amount, the number of groups having the corresponding maximum availability value pair, and set the number of groups in the maximum availability value pair table.

(Step S144) The job scheduling unit 160 obtains the p-value (p(m)) based on the created maximum availability value pair table. For example, the job scheduling unit 160 refers to the created maximum availability pair table, and counts the number of groups that have the maximum number of cores greater than or equal to the number of cores used that is determined in step S141 and have the maximum amount of memory greater than or equal to the memory usage that is determined in step S141. Then, the job scheduling unit 160 obtain the p-value by dividing the count result by the number of groups (N/m) to obtain the p-value.

(Step S145) The job scheduling unit 160 calculates the value of "1/m+p" based on the current m-value and p-value. Then, the job scheduling unit 160 determines whether the newly calculated value of "1/m+p" is less than the minimum value among the previously calculated values of "1/m+p". If the newly calculated value of "1/m+p" is less than the minimum value, the process proceeds to step S147. If the newly calculated value of "1/m+p" is greater than or equal to the minimum value, the process proceeds to step S146.

(Step S146) The job scheduling unit 160 determines whether the newly calculated value of "1/m+p" is greater than a predetermined threshold. For example, the threshold is twice the minimum value of "1/m+p". If the newly calculated value is greater than the threshold, the process proceeds to step S149. If the newly calculated value is less than or equal to the threshold, the process proceeds to step S148.

As illustrated in FIG. 15, the value of "1/m+p" first decreases as the m-value increases. However, after reaching the minimum value, the value of "1/m+p" increases substantially monotonically as the m-value increases. Accordingly, when the value of "1/m+p" exceeds twice the minimum value of "1/m+p", the value of "1/m+p" is expected to continue to increase monotonically. Accordingly, by terminating the processing when the value of "1/m+p" reaches the threshold, it is possible to omit useless processing and thus to improve the processing efficiency.

(Step S147) The job scheduling unit 160 updates the minimum value "1/m+p" to the newly calculated value of "1/m+p". Further, the job scheduling unit 160 stores the current m-value as the m-value that gives the minimum value for "1/m+p".

(Step S148) The job scheduling unit 160 increments the value of m. Then, if the job scheduling unit 160 determines that the incremented value of m satisfies the condition that "m is less than N/2 (m<N/2)", the processing of steps S143 through S147 is repeated. If the condition that "m is less than N/2" is not satisfied, the process exits the Loop D and proceeds to step S149.

(Step S149) The job scheduling unit 160 sets the m-value that gives the minimum value for "1/m+p" as the m-value to be used in the subsequent job scheduling.

(Step S150) The job scheduling unit 160 performs grouping of compute nodes while setting the number of compute nodes per group to m. The job scheduling unit 160 sets, in association with the node number of each compute node in the resource information, the group number of the group to which the compute node belongs. Then, the job scheduling unit 160 creates again the maximum availability value pair information 121 and the maximum availability value pair table 122 in accordance with the newly generated groups. Then, the m-value update process ends.

In this manner, it is possible to perform job scheduling efficiently. As a result, it is possible to reduce the scheduling cost and to prevent a reduction in performance of the job scheduler.

For example, it is possible to increase the processing speed 1/(p+1/m) times per scheduling process of a single job. The value of 1/(p+1/m) increases as the system load increases. For example, in the case of PC clusters, the total utilization rate is often greater than or equal to 95%. Then, the p-value is expected to be very small. The less the p-value is, the greater the speed increasing rate "1/(p+1/m)" is, so that the speed of scheduling processing is expected to increase several times.

Figure 21:
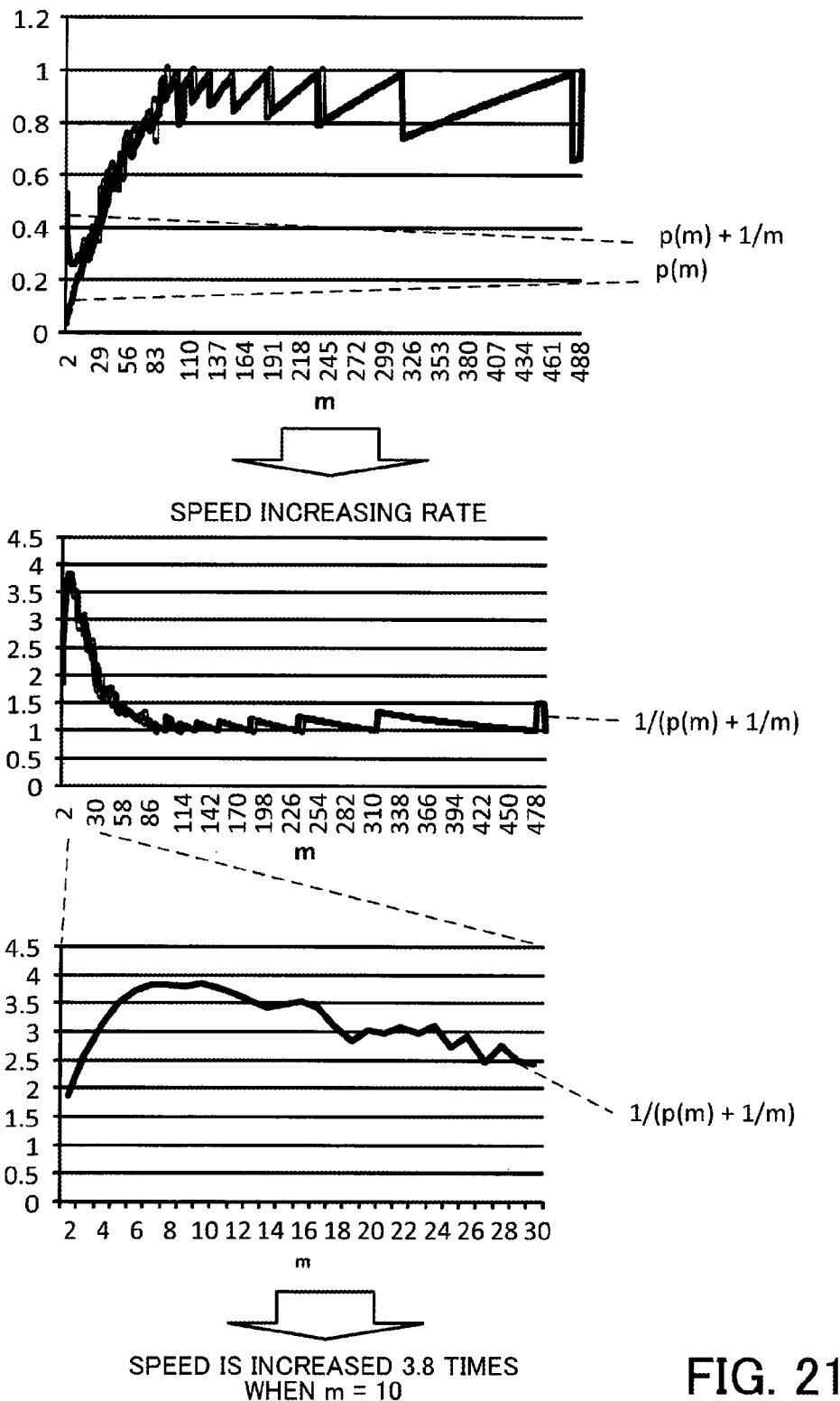
FIG. 21 illustrates the simulation results of a second job.
Figure 22:
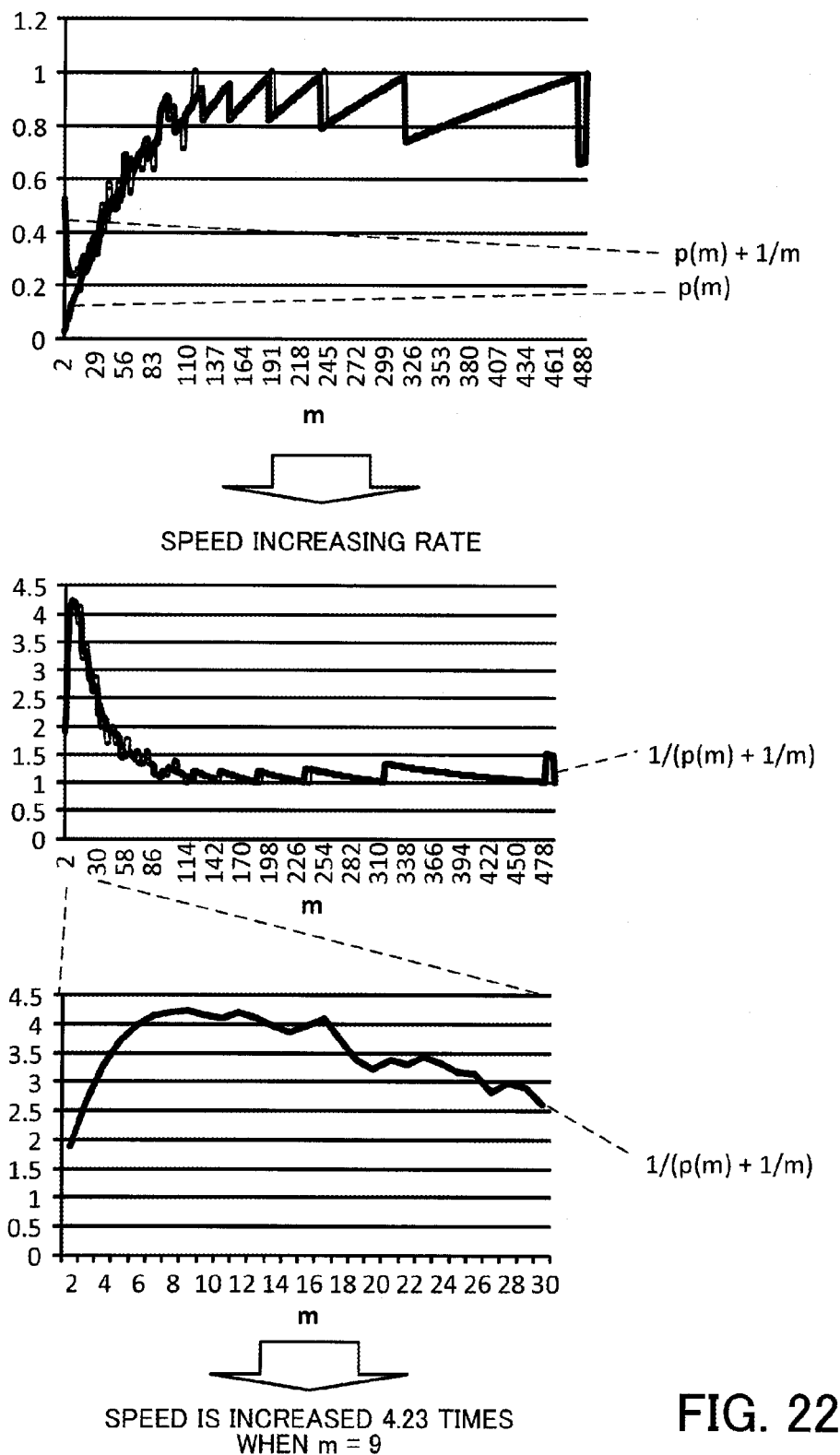
FIG. 22 illustrates the simulation results of a third job.

The following describes the simulation results of job scheduling with reference to FIGS. 20 to 22. In the example described below, the cost needed to assign a single job in the case where 95% of resources are used in a PC cluster of 1,000 nodes is calculated by simulation. In this simulation, the number of cores per compute node is set to 8.

If 95% of the cores are in use, 5% of the cores are available. When 5% of cores are available in 1,000 nodes, the number of available cores is 50 nodes×8 cores=400 cores. Thus, in the simulation, 400 cores are randomly distributed to 1,000 nodes while setting the pattern of the number of available cores per compute node to 1, 2, 3, 4, 5, 6, 7, or 8.

Further, if 95% of the memory is in use, then 5% of the memory is available. When 5% of the memory is available in 1,000 nodes, the available memory mount is 50 nodes×100%=5,000% (assuming that the memory amount of each node is 100%). Thus, 5,000% is randomly distributed to 1,000 nodes while setting the available memory pattern to a range from 10% to 100%.

Under these conditions, the scheduling costs of the following three job patterns are simulated.
First job: (the memory usage: 10%, the number of cores used: 1)
Second job: (the memory usage: 50%, the number of cores used: 4)
Third job: (the memory usage: 70%, the number of cores used: 6)

The graphs at the top in FIGS. 20 through 22 are line graphs illustrating how the values of "p(m)+1/m" and "p(m)" change as the m-value increases in the case of scheduling the first through third jobs. The graphs in the middle of FIGS. 20 through 22 are line graphs illustrating how the speed increasing rate increase changes as the m-value increases. The speed increasing rate is "1/(p(m)+1/m)". The graphs at the bottom of FIGS. 20 through 22 are line graphs illustrating how the speed increasing rate changes as the m-value increases in greater detail in the range where the speed increasing rate is maximized.

FIG. 20 illustrates the simulation results of the first job. According to the simulation results of FIG. 20, as for the first job, the speed increasing rate reaches the maximum value "2.89 times" when the m-value is 6.

FIG. 21 illustrates the simulation results of the second job. According to the simulation results of FIG. 21, as for the second job, the speed increasing rate reaches the maximum value "3.8 times" when the m-value is 10.

FIG. 22 illustrates the simulation results of the third job. According to the simulation results of FIG. 22, as for the third job, the speed increasing rate reaches the maximum value "4.23 times" when the m-value is 9.

That is, in the case where the processing load on the system is high, the second job scheduling process may be applied. Thus, groups that clearly do not include resources to which a job may be assigned are excluded (filtered out) from search objects. This improves the processing efficiency of job scheduling.

On the other hand, in the case where the system load is low, the compute node to which a job may be assigned is easily detected. In this case, the first job scheduling process may be applied. Thus, processing such as determining for each group whether to select the group as a search object is eliminated. This makes it possible to perform processing efficiently.

Further, the maximum availability value pair table for all the m-values is created periodically and the m-value that minimizes "1/m+p(m)" is calculated. Thus, the optimum m-value is obtained. By optimizing the m-value, even if there is a change in the job execution environment such as the status of processing load on the system, it is possible to perform efficient job scheduling using the m-value appropriate to the execution environment.

While particular embodiments of the present invention have been illustrated and described, it would be obvious that the components described in the embodiments may be replaced with other components having similar functions. Further, other arbitrary structures and steps may be added. Furthermore, two or more arbitrary structures (features) of the embodiments described above may be combined.

According to one aspect, the processing efficiency of job scheduling is improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A job scheduling apparatus comprising:
    a processor configured to perform a procedure including:
        determining, for each of a plurality of groups into which a plurality of compute nodes are divided, an available resource amount of a compute node having a greatest available resource amount among compute nodes belonging to the group as a maximum available resource amount of the group,
        comparing resource consumption of a job with the maximum available resource amount of each of the plurality of groups, and excluding a group whose maximum available resource amount is less than the resource consumption from search objects, and
        searching for a compute node whose available resource amount is greater than or equal to the resource consumption, from compute nodes belonging to a group that is not excluded from the search objects.

2. The job scheduling apparatus according to claim 1, wherein:
    the determining includes determining the available resource amount on a per-resource-type basis; and
    the comparing includes comparing the resource consumption of the job with the maximum available resource amount of each of the plurality of groups on the per-resource-type basis, and excluding a group whose maximum available resource amount of at least one resource type is less than the resource consumption from the search objects.

3. The job scheduling apparatus according to claim 1, wherein:
    the comparing includes calculating a percentage of groups whose maximum available resource amount is greater than or equal to the resource consumption based on a frequency distribution of the maximum available resource amount of each of the plurality of groups, and avoid performing the comparison between the resource consumption and the maximum available resource amount of each of the plurality of groups when the calculated percentage is greater than or equal to a predetermined value; and
    the searching includes searching for a compute node whose available resource amount is greater than or equal to the resource consumption from all the plurality of compute nodes when the calculated percentage is greater than or equal to the predetermined value.

4. The job scheduling apparatus according to claim 1, wherein the procedure further includes calculating a number of compute nodes per group that maximizes processing efficiency based on a frequency distribution of the maximum available resource amount of each of the plurality of groups, and performing grouping again by dividing the plurality of compute nodes into groups each including the calculated number of compute nodes.

5. The job scheduling apparatus according to claim 4, wherein the calculating includes generating a plurality of candidate values for the number of compute nodes per group, calculating, for each of the generated candidate values, a degree of improvement in the processing efficiency when the candidate value is set as the number of compute nodes per group, and selecting a candidate value that maximizes the processing efficiency as the number of compute nodes per group.

6. The job scheduling apparatus according to claim 5, wherein the calculating includes calculating the degree of improvement in the processing efficiency, for each of the candidate values in ascending order, and terminating the calculation of the degree of improvement in the processing efficiency when the degree of improvement in the processing efficiency tends to decrease as the candidate value increases.

7. The job scheduling apparatus according to claim 1, further comprising:
    a memory configured to store an available resource amount of each of the plurality of compute nodes;
    wherein the procedure further includes:
        instructing a compute node whose available resource amount is greater than or equal to the resource consumption to execute the job, and detecting completion of execution of the job, and
        updating the available resource amount of the compute node stored in the memory upon instructing the compute node to execute the job or upon completion of execution of the job by the compute node.

8. A job scheduling method comprising:
    dividing a plurality of compute nodes into a plurality of groups;
    determining, by a processor, for each of the plurality of groups, an available resource amount of a compute node having a greatest available resource amount among compute nodes belonging to the group as a maximum available resource amount of the group;
    comparing, by the processor, resource consumption of a job with the maximum available resource amount of each of the plurality of groups, and excluding a group whose maximum available resource amount is less than the resource consumption from search objects; and
    searching for, by the processor, a compute node whose available resource amount is greater than or equal to the resource consumption, from compute nodes belonging to a group that is not excluded from the search objects.

9. A non-transitory computer-readable storage medium storing a computer program which causes a computer to perform a procedure comprising:
    dividing a plurality of compute nodes into a plurality of groups;
    determining, for each of the plurality of groups, an available resource amount of a compute node having a greatest available resource amount among compute nodes belonging to the group as a maximum available resource amount of the group;

comparing resource consumption of a job with the maximum available resource amount of each of the plurality of groups, and excluding a group whose maximum available resource amount is less than the resource consumption from search objects; and searching for a compute node whose available resource amount is greater than or equal to the resource consumption, from compute nodes belonging to a group that is not excluded from the search objects.

* * * * *